(12) United States Patent
Pohl et al.

(10) Patent No.: US 9,086,145 B2
(45) Date of Patent: *Jul. 21, 2015

(54) CLAMPING FORCE GENERATOR

(71) Applicant: Fallbrook Intellectual Property Company LLC, San Diego, CA (US)

(72) Inventors: Brad P Pohl, Leander, TX (US); Daniel J Dawe, Austin, TX (US); Charles B Lohr, Austin, TX (US); Jon M Nichols, Georgetown, TX (US)

(73) Assignee: Fallbrook Intellectual Property Company LLC, Cedar Park, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/765,409

(22) Filed: Feb. 12, 2013

(65) Prior Publication Data

US 2013/0152715 A1 Jun. 20, 2013

Related U.S. Application Data

(63) Continuation of application No. 12/514,062, filed as application No. PCT/US2007/023315 on Nov. 6, 2007, now Pat. No. 8,376,903.

(60) Provisional application No. 60/864,941, filed on Nov. 8, 2006.

(51) Int. Cl.
*F16H 15/28* (2006.01)
*F16H 61/664* (2006.01)
(Continued)

(52) U.S. Cl.
CPC ............ *F16H 61/664* (2013.01); *F16H 15/28* (2013.01); *F16H 15/52* (2013.01); *F16H 25/186* (2013.01); *Y10T 74/18304* (2015.01); *Y10T 74/18312* (2015.01)

(58) Field of Classification Search
USPC ........... 476/36, 37, 38, 4, 5, 61, 65; 74/56, 57
See application file for complete search history.

(56) References Cited

U.S. PATENT DOCUMENTS

| 719,595 A | 2/1903 | Huss |
|---|---|---|
| 1,121,210 A | 12/1914 | Techel |

(Continued)

FOREIGN PATENT DOCUMENTS

| CH | 118064 | 12/1926 |
|---|---|---|
| CN | 1054340 | 9/1991 |

(Continued)

OTHER PUBLICATIONS

International Search Report for International Application No. PCT/US2007/023315 dated Apr. 16, 2008.

(Continued)

*Primary Examiner* — William C Joyce
(74) *Attorney, Agent, or Firm* — Knobbe Martens Olson & Bear LLP

(57) ABSTRACT

Mechanisms and methods for clamping force generation are disclosed. In one embodiment, a clamping force generator includes a spring coupled to a traction ring and to a load cam roller cage. The traction ring can be provided with a recess to receive the spring. In some embodiments, a relatively short spring is provided. In other embodiments, a spring couples to a wire and the spring-wire combination couples to the traction ring and the load cam roller cage. In some embodiments, the load cam roller cage is provided with tabs adapted to engage the wire and/or the spring. In yet other embodiments, the traction ring is configured to receive a dowel pin for coupling to the spring. One or more of the tabs can include a tab notch that cooperates with a stop pin coupled to the traction ring to provide adjustment of the travel of the load cam roller cage.

20 Claims, 27 Drawing Sheets

(51) Int. Cl.
*F16H 15/52* (2006.01)
*F16H 25/18* (2006.01)

(56) References Cited

U.S. PATENT DOCUMENTS

| | | |
|---|---|---|
| 1,175,677 A | 3/1916 | Barnes |
| 1,207,985 A | 12/1916 | Null et al. |
| 1,380,006 A | 5/1921 | Nielson |
| 1,390,971 A | 9/1921 | Samain |
| 1,558,222 A | 10/1925 | Beetow |
| 1,629,092 A | 5/1927 | Arter et al. |
| 1,629,902 A | 5/1927 | Arter et al. |
| 1,686,446 A | 10/1928 | Gilman |
| 1,774,254 A | 8/1930 | Daukus |
| 1,793,571 A | 2/1931 | Vaughn |
| 1,847,027 A | 2/1932 | Thomsen et al. |
| 1,850,189 A | 3/1932 | Weiss |
| 1,858,696 A | 5/1932 | Weiss |
| 1,865,102 A | 6/1932 | Hayes |
| 1,903,228 A | 3/1933 | Thomson |
| 1,947,044 A | 2/1934 | Gove |
| 1,978,439 A | 10/1934 | Sharpe |
| 2,030,203 A | 2/1936 | Gove et al. |
| 2,060,884 A | 11/1936 | Madle |
| 2,086,491 A | 7/1937 | Dodge |
| 2,100,629 A | 11/1937 | Chilton |
| 2,109,845 A | 3/1938 | Madle |
| 2,112,763 A | 3/1938 | Cloudsley |
| 2,134,225 A | 10/1938 | Christiansen |
| 2,152,796 A | 4/1939 | Erban |
| 2,196,064 A | 4/1940 | Erban |
| 2,209,254 A | 7/1940 | Ahnger |
| 2,259,933 A | 10/1941 | Holloway |
| 2,269,434 A | 1/1942 | Brooks |
| 2,325,502 A | 7/1943 | Georges |
| RE22,761 E | 5/1946 | Wemp |
| 2,461,258 A | 2/1949 | Brooks |
| 2,469,653 A | 5/1949 | Kopp |
| 2,480,968 A | 9/1949 | Ronai |
| 2,586,725 A | 2/1952 | Henry |
| 2,596,538 A | 5/1952 | Dicke |
| 2,597,849 A | 5/1952 | Alfredeen |
| 2,675,713 A | 4/1954 | Acker |
| 2,696,888 A | 12/1954 | Chillson et al. |
| 2,730,904 A | 1/1956 | Rennerfelt |
| 2,748,614 A | 6/1956 | Weisel |
| 2,868,038 A | 1/1959 | Billeter |
| 2,959,070 A | 1/1959 | Flinn |
| 2,873,911 A | 2/1959 | Perrine |
| 2,874,592 A | 2/1959 | Oehrli |
| 2,883,883 A | 4/1959 | Chillson |
| 2,891,213 A | 6/1959 | Kern |
| 2,901,924 A | 9/1959 | Banker |
| 2,913,932 A | 11/1959 | Oehru |
| 2,931,234 A | 4/1960 | Hayward |
| 2,931,235 A | 4/1960 | Hayward |
| 3,204,476 A | 4/1960 | Rouverol |
| 2,949,800 A | 8/1960 | Neuschotz |
| 2,959,063 A | 11/1960 | Perry |
| 2,959,972 A | 11/1960 | Madson |
| 2,964,959 A | 12/1960 | Beck |
| 3,008,061 A | 11/1961 | Mims et al. |
| 3,048,056 A | 8/1962 | Wolfram |
| 3,051,020 A | 8/1962 | Hartupee |
| 3,086,704 A | 4/1963 | Hurtt |
| 3,087,348 A | 4/1963 | Kraus |
| 3,283,614 A | 4/1963 | Hewko |
| 3,154,957 A | 11/1964 | Kashihara |
| 3,163,050 A | 12/1964 | Kraus |
| 3,176,542 A | 4/1965 | Monch |
| 3,184,983 A | 5/1965 | Kraus |
| 3,209,606 A | 10/1965 | Yamamoto |
| 3,211,364 A | 10/1965 | Wentling et al. |
| 3,216,283 A | 11/1965 | General |
| 3,246,531 A | 4/1966 | Kashihara |
| 3,248,960 A | 5/1966 | Schottler |
| 3,273,468 A | 9/1966 | Allen |
| 3,280,646 A | 10/1966 | Lemieux |
| 3,292,443 A | 12/1966 | Felix |
| 3,340,895 A | 9/1967 | Osgood, Jr. et al. |
| 3,407,687 A | 10/1968 | Hayashi |
| 3,440,895 A | 4/1969 | Fellows |
| 3,464,281 A | 9/1969 | Azuma et al. |
| 3,477,315 A | 11/1969 | Macks |
| 3,487,726 A | 1/1970 | Burnett |
| 3,487,727 A | 1/1970 | Gustafsson |
| 3,574,289 A | 4/1971 | Scheiter et al. |
| 3,661,404 A | 5/1972 | Bossaer |
| 3,695,120 A | 10/1972 | Titt |
| 3,707,888 A | 1/1973 | Schottler |
| 3,727,473 A | 4/1973 | Bayer |
| 3,727,474 A | 4/1973 | Fullerton |
| 3,736,803 A | 6/1973 | Horowitz et al. |
| 3,768,715 A | 10/1973 | Tout |
| 3,800,607 A | 4/1974 | Zurcher |
| 3,802,284 A | 4/1974 | Sharpe et al. |
| 3,810,398 A | 5/1974 | Kraus |
| 3,820,416 A | 6/1974 | Kraus |
| 3,866,985 A | 2/1975 | Whitehurst |
| 3,891,235 A | 6/1975 | Shelly |
| 3,934,493 A | 1/1976 | Hillyer |
| 3,954,282 A | 5/1976 | Hege |
| 3,987,681 A | 10/1976 | Keithley et al. |
| 3,996,807 A | 12/1976 | Adams |
| 4,098,146 A | 7/1978 | McLarty |
| 4,103,514 A | 8/1978 | Grosse-Entrup |
| 4,159,653 A | 7/1979 | Koivunen |
| 4,169,609 A | 10/1979 | Zampedro |
| 4,177,683 A | 12/1979 | Moses |
| 4,227,712 A | 10/1980 | Dick |
| 4,314,485 A | 2/1982 | Adams |
| 4,345,486 A | 8/1982 | Olesen |
| 4,369,667 A | 1/1983 | Kemper |
| 4,382,188 A | 5/1983 | Cronin |
| 4,391,156 A | 7/1983 | Tibbals |
| 4,459,873 A | 7/1984 | Black |
| 4,464,952 A | 8/1984 | Stubbs |
| 4,468,984 A | 9/1984 | Castelli et al. |
| 4,494,524 A | 1/1985 | Wagner |
| 4,496,051 A | 1/1985 | Ortner |
| 4,501,172 A | 2/1985 | Kraus |
| 4,526,255 A | 7/1985 | Hennessey et al. |
| 4,546,673 A | 10/1985 | Shigematsu et al. |
| 4,560,369 A | 12/1985 | Hattori |
| 4,567,781 A | 2/1986 | Russ |
| 4,574,649 A | 3/1986 | Seol |
| 4,585,429 A | 4/1986 | Marier |
| 4,617,838 A | 10/1986 | Anderson |
| 4,630,839 A | 12/1986 | Seol |
| 4,631,469 A | 12/1986 | Tsuboi et al. |
| 4,651,082 A | 3/1987 | Kaneyuki |
| 4,663,990 A | 5/1987 | Itoh et al. |
| 4,700,581 A | 10/1987 | Tibbals, Jr. |
| 4,713,976 A | 12/1987 | Wilkes |
| 4,717,368 A | 1/1988 | Yamaguchi et al. |
| 4,735,430 A | 4/1988 | Tomkinson |
| 4,738,164 A | 4/1988 | Kaneyuki |
| 4,744,261 A | 5/1988 | Jacobson |
| 4,756,211 A | 7/1988 | Fellows |
| 4,781,663 A | 11/1988 | Reswick |
| 4,838,122 A | 6/1989 | Takamiya et al. |
| 4,856,374 A | 8/1989 | Kreuzer |
| 4,869,130 A | 9/1989 | Wiecko |
| 4,881,925 A | 11/1989 | Hattori |
| 4,900,046 A | 2/1990 | Aranceta-Angoitia |
| 4,909,101 A | 3/1990 | Terry |
| 4,918,344 A | 4/1990 | Chikamori et al. |
| 4,964,312 A | 10/1990 | Kraus |
| 5,006,093 A | 4/1991 | Itoh et al. |
| 5,020,384 A | 6/1991 | Kraus |
| 5,033,322 A | 7/1991 | Nakano |
| 5,037,361 A | 8/1991 | Takahashi |
| 5,044,214 A | 9/1991 | Barber |
| 5,069,655 A | 12/1991 | Schivelbusch |

(56) References Cited

U.S. PATENT DOCUMENTS

| | | |
|---|---|---|
| 5,099,710 A | 3/1992 | Nakano |
| 5,121,654 A | 6/1992 | Fasce |
| 5,125,677 A | 6/1992 | Ogilvie et al. |
| 5,138,894 A | 8/1992 | Kraus |
| 5,156,412 A | 10/1992 | Meguerditchian |
| 5,230,258 A | 7/1993 | Nakano |
| 5,236,211 A | 8/1993 | Meguerditchian |
| 5,236,403 A | 8/1993 | Schievelbusch |
| 5,267,920 A | 12/1993 | Hibi |
| 5,273,501 A | 12/1993 | Schievelbusch |
| 5,318,486 A | 6/1994 | Lutz |
| 5,319,486 A | 6/1994 | Vogel et al. |
| 5,330,396 A | 7/1994 | Lohr et al. |
| 5,355,749 A | 10/1994 | Obara et al. |
| 5,375,865 A | 12/1994 | Terry, Sr. |
| 5,379,661 A | 1/1995 | Nakano |
| 5,383,677 A | 1/1995 | Thomas |
| 5,387,000 A | 2/1995 | Sato |
| 5,401,221 A | 3/1995 | Fellows et al. |
| 5,451,070 A | 9/1995 | Lindsay et al. |
| 5,489,003 A | 2/1996 | Ohyama et al. |
| 5,508,574 A | 4/1996 | Vlock |
| 5,562,564 A | 10/1996 | Folino |
| 5,564,998 A | 10/1996 | Fellows |
| 5,601,301 A | 2/1997 | Liu |
| 5,607,373 A | 3/1997 | Ochiai et al. |
| 5,645,507 A | 7/1997 | Hathaway |
| 5,651,750 A | 7/1997 | Imanishi et al. |
| 5,664,636 A | 9/1997 | Ikuma et al. |
| 5,669,845 A | 9/1997 | Muramoto et al. |
| 5,690,346 A | 11/1997 | Keskitalo |
| 5,722,502 A | 3/1998 | Kubo |
| 5,746,676 A | 5/1998 | Kawase et al. |
| 5,755,303 A | 5/1998 | Yamamoto et al. |
| 5,799,541 A | 9/1998 | Arbeiter |
| 5,823,052 A | 10/1998 | Nobumoto |
| 5,846,155 A | 12/1998 | Taniguchi et al. |
| 5,888,160 A | 3/1999 | Miyata et al. |
| 5,899,827 A | 5/1999 | Nakano et al. |
| 5,902,207 A | 5/1999 | Sugihara |
| 5,967,933 A | 10/1999 | Valdenaire |
| 5,984,826 A | 11/1999 | Nakano |
| 6,000,707 A | 12/1999 | Miller |
| 6,004,239 A | 12/1999 | Makino |
| 6,006,151 A | 12/1999 | Graf |
| 6,015,359 A | 1/2000 | Kunii |
| 6,019,701 A | 2/2000 | Mori et al. |
| 6,029,990 A | 2/2000 | Busby |
| 6,042,132 A | 3/2000 | Suenaga et al. |
| 6,045,477 A | 4/2000 | Schmidt |
| 6,045,481 A | 4/2000 | Kumagai |
| 6,053,833 A | 4/2000 | Masaki |
| 6,053,841 A | 4/2000 | Koide et al. |
| 6,054,844 A | 4/2000 | Frank |
| 6,066,067 A | 5/2000 | Greenwood |
| 6,071,210 A | 6/2000 | Kato |
| 6,076,846 A | 6/2000 | Clardy |
| 6,079,726 A | 6/2000 | Busby |
| 6,086,506 A | 7/2000 | Petersmann et al. |
| 6,095,940 A | 8/2000 | Ai et al. |
| 6,099,431 A | 8/2000 | Hoge et al. |
| 6,113,513 A | 9/2000 | Itoh et al. |
| 6,119,539 A | 9/2000 | Papanicolaou |
| 6,119,800 A | 9/2000 | McComber |
| 6,159,126 A | 12/2000 | Oshidan |
| 6,171,210 B1 | 1/2001 | Miyata et al. |
| 6,174,260 B1 | 1/2001 | Tsukada et al. |
| 6,186,922 B1 | 2/2001 | Bursal et al. |
| 6,217,473 B1 | 4/2001 | Ueda et al. |
| 6,241,636 B1 | 6/2001 | Miller |
| 6,243,638 B1 | 6/2001 | Abo et al. |
| 6,251,038 B1 | 6/2001 | Ishikawa et al. |
| 6,258,003 B1 | 7/2001 | Hirano et al. |
| 6,261,200 B1 | 7/2001 | Miyata et al. |
| 6,311,113 B1 | 10/2001 | Danz et al. |
| 6,312,358 B1 | 11/2001 | Goi et al. |
| 6,322,475 B2 | 11/2001 | Miller |
| 6,325,386 B1 | 12/2001 | Shoge |
| 6,358,178 B1 | 3/2002 | Wittkopp |
| 6,375,412 B1 | 4/2002 | Dial |
| 6,390,945 B1 | 5/2002 | Young |
| 6,390,946 B1 | 5/2002 | Hibi et al. |
| 6,406,399 B1 | 6/2002 | Ai |
| 6,414,401 B1 | 7/2002 | Kuroda et al. |
| 6,419,608 B1 | 7/2002 | Miller |
| 6,425,838 B1 | 7/2002 | Matsubara et al. |
| 6,434,960 B1 | 8/2002 | Rousseau |
| 6,440,037 B2 | 8/2002 | Takagi et al. |
| 6,461,268 B1 | 10/2002 | Milner |
| 6,482,094 B2 | 11/2002 | Kefes |
| 6,492,785 B1 | 12/2002 | Kasten et al. |
| 6,494,805 B2 | 12/2002 | Ooyama et al. |
| 6,499,373 B2 | 12/2002 | Van Cor |
| 6,514,175 B2 | 2/2003 | Taniguchi et al. |
| 6,532,890 B2 | 3/2003 | Chen |
| 6,551,210 B2 | 4/2003 | Miller |
| 6,575,047 B2 | 6/2003 | Reik et al. |
| 6,659,901 B2 | 12/2003 | Sakai et al. |
| 6,672,418 B1 | 1/2004 | Makino |
| 6,676,559 B2 | 1/2004 | Miller |
| 6,679,109 B2 | 1/2004 | Gierling et al. |
| 6,682,432 B1 | 1/2004 | Shinozuka |
| 6,689,012 B2 | 2/2004 | Miller |
| 6,721,637 B2 | 4/2004 | Abe et al. |
| 6,723,016 B2 | 4/2004 | Sumi |
| 6,805,654 B2 | 10/2004 | Nishii |
| 6,808,053 B2 | 10/2004 | Kirkwood et al. |
| 6,839,617 B2 | 1/2005 | Mensler et al. |
| 6,849,020 B2 | 2/2005 | Sumi |
| 6,859,709 B2 | 2/2005 | Joe et al. |
| 6,931,316 B2 | 8/2005 | Joe et al. |
| 6,932,739 B2 | 8/2005 | Miyata et al. |
| 6,942,593 B2 | 9/2005 | Nishii et al. |
| 6,945,903 B2 | 9/2005 | Miller |
| 6,949,049 B2 | 9/2005 | Miller |
| 6,958,029 B2 | 10/2005 | Inoue |
| 6,991,575 B2 | 1/2006 | Inoue |
| 6,991,579 B2 | 1/2006 | Kobayashi et al. |
| 7,011,600 B2 | 3/2006 | Miller et al. |
| 7,011,601 B2 | 3/2006 | Miller |
| 7,014,591 B2 | 3/2006 | Miller |
| 7,029,418 B2 | 4/2006 | Taketsuna et al. |
| 7,032,914 B2 | 4/2006 | Miller |
| 7,036,620 B2 | 5/2006 | Miller et al. |
| 7,044,884 B2 | 5/2006 | Miller |
| 7,063,640 B2 | 6/2006 | Miller |
| 7,074,007 B2 | 7/2006 | Miller |
| 7,074,154 B2 | 7/2006 | Miller |
| 7,074,155 B2 | 7/2006 | Miller |
| 7,077,777 B2 | 7/2006 | Miyata et al. |
| 7,086,979 B2 | 8/2006 | Frenken |
| 7,086,981 B2 | 8/2006 | Ali et al. |
| 7,094,171 B2 | 8/2006 | Inoue |
| 7,111,860 B1 | 9/2006 | Grimaldos |
| 7,112,158 B2 | 9/2006 | Miller |
| 7,112,159 B2 | 9/2006 | Miller et al. |
| 7,125,297 B2 | 10/2006 | Miller et al. |
| 7,131,930 B2 | 11/2006 | Miller et al. |
| 7,140,999 B2 | 11/2006 | Miller |
| 7,147,586 B2 | 12/2006 | Miller et al. |
| 7,153,233 B2 | 12/2006 | Miller et al. |
| 7,156,770 B2 | 1/2007 | Miller |
| 7,160,220 B2 | 1/2007 | Shinojima et al. |
| 7,160,222 B2 | 1/2007 | Miller |
| 7,163,485 B2 | 1/2007 | Miller |
| 7,163,486 B2 | 1/2007 | Miller et al. |
| 7,166,052 B2 | 1/2007 | Miller et al. |
| 7,166,056 B2 | 1/2007 | Miller et al. |
| 7,166,057 B2 | 1/2007 | Miller et al. |
| 7,166,058 B2 | 1/2007 | Miller et al. |
| 7,169,076 B2 | 1/2007 | Miller et al. |
| 7,172,529 B2 | 2/2007 | Miller et al. |
| 7,175,564 B2 | 2/2007 | Miller |
| 7,175,565 B2 | 2/2007 | Miller et al. |

(56) References Cited

U.S. PATENT DOCUMENTS

| | | |
|---|---|---|
| 7,175,566 B2 | 2/2007 | Miller et al. |
| 7,192,381 B2 | 3/2007 | Miller et al. |
| 7,197,915 B2 | 4/2007 | Luh et al. |
| 7,198,582 B2 | 4/2007 | Miller et al. |
| 7,198,583 B2 | 4/2007 | Miller et al. |
| 7,198,584 B2 | 4/2007 | Miller et al. |
| 7,198,585 B2 | 4/2007 | Miller et al. |
| 7,201,693 B2 | 4/2007 | Miller et al. |
| 7,201,694 B2 | 4/2007 | Miller et al. |
| 7,201,695 B2 | 4/2007 | Miller et al. |
| 7,204,777 B2 | 4/2007 | Miller et al. |
| 7,214,159 B2 | 5/2007 | Miller et al. |
| 7,217,215 B2 | 5/2007 | Miller et al. |
| 7,217,216 B2 | 5/2007 | Inoue |
| 7,217,219 B2 | 5/2007 | Miller |
| 7,217,220 B2 | 5/2007 | Careau et al. |
| 7,232,395 B2 | 6/2007 | Miller et al. |
| 7,234,873 B2 | 6/2007 | Kato et al. |
| 7,235,031 B2 | 6/2007 | Miller et al. |
| 7,238,136 B2 | 7/2007 | Miller et al. |
| 7,238,137 B2 | 7/2007 | Miller et al. |
| 7,238,138 B2 | 7/2007 | Miller et al. |
| 7,238,139 B2 | 7/2007 | Roethler et al. |
| 7,246,672 B2 | 7/2007 | Shirai et al. |
| 7,250,018 B2 | 7/2007 | Miller et al. |
| 7,261,663 B2 | 8/2007 | Miller et al. |
| 7,275,610 B2 | 10/2007 | Kuang et al. |
| 7,285,068 B2 | 10/2007 | Hosoi |
| 7,288,042 B2 | 10/2007 | Miller et al. |
| 7,288,043 B2 | 10/2007 | Shioiri et al. |
| 7,320,660 B2 | 1/2008 | Miller |
| 7,322,901 B2 | 1/2008 | Miller et al. |
| 7,343,236 B2 | 3/2008 | Wilson |
| 7,347,801 B2 | 3/2008 | Guenter et al. |
| 7,384,370 B2 | 6/2008 | Miller |
| 7,393,300 B2 | 7/2008 | Miller et al. |
| 7,393,302 B2 | 7/2008 | Miller |
| 7,393,303 B2 | 7/2008 | Miller |
| 7,395,731 B2 | 7/2008 | Miller et al. |
| 7,396,209 B2 | 7/2008 | Miller et al. |
| 7,402,122 B2 | 7/2008 | Miller |
| 7,410,443 B2 | 8/2008 | Miller |
| 7,419,451 B2 | 9/2008 | Miller |
| 7,422,541 B2 | 9/2008 | Miller |
| 7,422,546 B2 | 9/2008 | Miller et al. |
| 7,427,253 B2 | 9/2008 | Miller |
| 7,431,677 B2 | 10/2008 | Miller et al. |
| 7,452,297 B2 | 11/2008 | Miller et al. |
| 7,455,611 B2 | 11/2008 | Miller et al. |
| 7,455,617 B2 | 11/2008 | Miller et al. |
| 7,462,123 B2 | 12/2008 | Miller et al. |
| 7,462,127 B2 | 12/2008 | Miller et al. |
| 7,470,210 B2 | 12/2008 | Miller et al. |
| 7,481,736 B2 | 1/2009 | Miller et al. |
| 7,510,499 B2 | 3/2009 | Miller et al. |
| 7,540,818 B2 | 6/2009 | Miller et al. |
| 7,547,264 B2 | 6/2009 | Usoro |
| 7,574,935 B2 | 8/2009 | Rohs et al. |
| 7,591,755 B2 | 9/2009 | Petrzik et al. |
| 7,632,203 B2 | 12/2009 | Miller |
| 7,651,437 B2 | 1/2010 | Miller et al. |
| 7,654,928 B2 | 2/2010 | Miller et al. |
| 7,670,243 B2 | 3/2010 | Miller |
| 7,686,729 B2 | 3/2010 | Miller et al. |
| 7,727,101 B2 | 6/2010 | Miller |
| 7,727,107 B2 | 6/2010 | Miller |
| 7,727,108 B2 | 6/2010 | Miller et al. |
| 7,727,110 B2 | 6/2010 | Miller et al. |
| 7,727,115 B2 | 6/2010 | Serkh |
| 7,731,615 B2 | 6/2010 | Miller et al. |
| 7,762,919 B2 | 7/2010 | Smithson et al. |
| 7,762,920 B2 | 7/2010 | Smithson et al. |
| 7,770,674 B2 | 8/2010 | Miles et al. |
| 7,785,228 B2 | 8/2010 | Smithson et al. |
| 7,828,685 B2 | 11/2010 | Miller |
| 7,837,592 B2 | 11/2010 | Miller |
| 7,871,353 B2 | 1/2011 | Nichols et al. |
| 7,882,762 B2 | 2/2011 | Armstrong et al. |
| 7,883,442 B2 | 2/2011 | Miller et al. |
| 7,885,747 B2 | 2/2011 | Miller et al. |
| 7,887,032 B2 | 2/2011 | Malone |
| 7,909,723 B2 | 3/2011 | Triller et al. |
| 7,909,727 B2 | 3/2011 | Smithson et al. |
| 7,914,029 B2 | 3/2011 | Miller et al. |
| 7,959,533 B2 | 6/2011 | Nichols et al. |
| 7,963,880 B2 | 6/2011 | Smithson et al. |
| 7,967,719 B2 | 6/2011 | Smithson et al. |
| 7,976,426 B2 | 7/2011 | Smithson et al. |
| 8,066,613 B2 | 11/2011 | Smithson et al. |
| 8,066,614 B2 | 11/2011 | Miller et al. |
| 8,070,635 B2 | 12/2011 | Miller |
| 8,087,482 B2 | 1/2012 | Miles et al. |
| 8,123,653 B2 | 2/2012 | Smithson et al. |
| 8,133,149 B2 | 3/2012 | Smithson et al. |
| 8,142,323 B2 | 3/2012 | Tsuchiya et al. |
| 8,167,759 B2 | 5/2012 | Pohl et al. |
| 8,171,636 B2 | 5/2012 | Smithson et al. |
| 8,230,961 B2 | 7/2012 | Schneidewind |
| 8,262,536 B2 | 9/2012 | Nichols et al. |
| 8,267,829 B2 | 9/2012 | Miller et al. |
| 8,313,404 B2 | 11/2012 | Carter et al. |
| 8,313,405 B2 | 11/2012 | Bazyn et al. |
| 8,317,650 B2 | 11/2012 | Nichols et al. |
| 8,317,651 B2 | 11/2012 | Lohr |
| 8,321,097 B2 | 11/2012 | Vasiliotis et al. |
| 8,342,999 B2 | 1/2013 | Miller |
| 8,360,917 B2 | 1/2013 | Nichols et al. |
| 8,376,889 B2 | 2/2013 | Hoffman et al. |
| 8,376,903 B2 | 2/2013 | Pohl et al. |
| 8,382,631 B2 | 2/2013 | Hoffman et al. |
| 8,382,637 B2 | 2/2013 | Tange |
| 8,393,989 B2 | 3/2013 | Pohl |
| 8,480,529 B2 | 7/2013 | Pohl et al. |
| 8,506,452 B2 | 8/2013 | Pohl et al. |
| 8,535,199 B2 | 9/2013 | Lohr et al. |
| 8,550,949 B2 | 10/2013 | Miller |
| 8,585,528 B2 | 11/2013 | Carter et al. |
| 8,622,866 B2 | 1/2014 | Bazyn et al. |
| 8,626,409 B2 | 1/2014 | Vasiliotis et al. |
| 8,628,443 B2 | 1/2014 | Miller et al. |
| 8,641,572 B2 | 2/2014 | Nichols et al. |
| 8,641,577 B2 | 2/2014 | Nichols et al. |
| 8,663,050 B2 | 3/2014 | Nichols et al. |
| 8,721,485 B2 | 5/2014 | Lohr et al. |
| 8,784,248 B2 | 7/2014 | Murakami et al. |
| 8,852,050 B2 | 10/2014 | Thomassy |
| 8,888,643 B2 | 11/2014 | Lohr et al. |
| 2001/0008192 A1 | 7/2001 | Morisawa |
| 2001/0041644 A1 | 11/2001 | Yasuoka et al. |
| 2001/0044361 A1 | 11/2001 | Taniguchi et al. |
| 2002/0019285 A1 | 2/2002 | Henzler |
| 2002/0028722 A1 | 3/2002 | Sakai et al. |
| 2002/0045511 A1 | 4/2002 | Geiberger et al. |
| 2002/0128107 A1 | 9/2002 | Wakayama |
| 2002/0169051 A1 | 11/2002 | Oshidari |
| 2003/0015358 A1 | 1/2003 | Abe et al. |
| 2003/0015874 A1 | 1/2003 | Abe et al. |
| 2003/0022753 A1 | 1/2003 | Mizuno et al. |
| 2003/0036456 A1 | 2/2003 | Skrabs |
| 2003/0132051 A1 | 7/2003 | Nishii et al. |
| 2003/0135316 A1 | 7/2003 | Kawamura et al. |
| 2003/0216216 A1 | 11/2003 | Inoue et al. |
| 2003/0221892 A1 | 12/2003 | Matsumoto et al. |
| 2004/0038772 A1 | 2/2004 | McIndoe et al. |
| 2004/0058772 A1 | 3/2004 | Inoue et al. |
| 2004/0067816 A1 | 4/2004 | Taketsuna et al. |
| 2004/0082421 A1 | 4/2004 | Wafzig |
| 2004/0092359 A1 | 5/2004 | Imanishi et al. |
| 2004/0119345 A1 | 6/2004 | Takano |
| 2004/0171457 A1 | 9/2004 | Fuller |
| 2004/0204283 A1 | 10/2004 | Inoue |
| 2004/0231331 A1 | 11/2004 | Iwanami et al. |
| 2004/0254047 A1 | 12/2004 | Frank et al. |
| 2005/0037876 A1 | 2/2005 | Unno et al. |

(56) References Cited

U.S. PATENT DOCUMENTS

| | | |
|---|---|---|
| 2005/0085338 A1 | 4/2005 | Miller et al. |
| 2005/0085979 A1 | 4/2005 | Carlson et al. |
| 2005/0227809 A1 | 10/2005 | Bitzer et al. |
| 2006/0006008 A1 | 1/2006 | Brunemann et al. |
| 2006/0052204 A1 | 3/2006 | Eckert et al. |
| 2006/0084549 A1 | 4/2006 | Smithson et al. |
| 2006/0108956 A1 | 5/2006 | Clark |
| 2006/0111212 A9 | 5/2006 | Ai et al. |
| 2006/0154775 A1 | 7/2006 | Ali et al. |
| 2006/0180363 A1 | 8/2006 | Uchisasai |
| 2006/0223667 A1 | 10/2006 | Nakazeki |
| 2006/0234822 A1 | 10/2006 | Morscheck et al. |
| 2006/0276299 A1 | 12/2006 | Imanishi |
| 2007/0004552 A1 | 1/2007 | Matsudaira et al. |
| 2007/0004556 A1 | 1/2007 | Rohs et al. |
| 2007/0149342 A1 | 6/2007 | Guenter et al. |
| 2007/0155567 A1 | 7/2007 | Miller et al. |
| 2007/0193391 A1 | 8/2007 | Armstrong et al. |
| 2007/0228687 A1 | 10/2007 | Parker |
| 2008/0032852 A1 | 2/2008 | Smithson et al. |
| 2008/0032854 A1 | 2/2008 | Smithson et al. |
| 2008/0039269 A1 | 2/2008 | Smithson et al. |
| 2008/0039273 A1 | 2/2008 | Smithson et al. |
| 2008/0039276 A1 | 2/2008 | Smithson et al. |
| 2008/0081728 A1 | 4/2008 | Faulring et al. |
| 2008/0139363 A1 | 6/2008 | Williams |
| 2008/0141809 A1 | 6/2008 | Miller et al. |
| 2008/0149407 A1 | 6/2008 | Shibata et al. |
| 2008/0200300 A1 | 8/2008 | Smithson et al. |
| 2008/0228362 A1 | 9/2008 | Muller et al. |
| 2008/0284170 A1 | 11/2008 | Cory |
| 2008/0305920 A1 | 12/2008 | Nishii et al. |
| 2009/0023545 A1 | 1/2009 | Beaudoin |
| 2009/0082169 A1 | 3/2009 | Kolstrup |
| 2009/0107454 A1 | 4/2009 | Hiyoshi et al. |
| 2009/0132135 A1 | 5/2009 | Quinn et al. |
| 2009/0251013 A1 | 10/2009 | Vollmer et al. |
| 2010/0056322 A1 | 3/2010 | Thomassy |
| 2010/0093479 A1 | 4/2010 | Carter et al. |
| 2011/0088503 A1 | 4/2011 | Armstrong et al. |
| 2011/0127096 A1 | 6/2011 | Schneidewind |
| 2011/0172050 A1 | 7/2011 | Nichols et al. |
| 2011/0184614 A1 | 7/2011 | Keilers et al. |
| 2011/0218072 A1 | 9/2011 | Lohr et al. |
| 2011/0230297 A1 | 9/2011 | Shiina et al. |
| 2011/0291507 A1 | 12/2011 | Post |
| 2011/0319222 A1 | 12/2011 | Ogawa et al. |
| 2012/0035015 A1 | 2/2012 | Ogawa et al. |
| 2012/0238386 A1 | 9/2012 | Pohl et al. |
| 2012/0258839 A1 | 10/2012 | Smithson et al. |
| 2012/0309579 A1 | 12/2012 | Miller et al. |
| 2013/0035200 A1 | 2/2013 | Noji et al. |
| 2013/0053211 A1 | 2/2013 | Fukuda et al. |
| 2013/0095977 A1 | 4/2013 | Smithson et al. |
| 2013/0102434 A1 | 4/2013 | Nichols et al. |
| 2013/0146406 A1 | 6/2013 | Nichols et al. |
| 2013/0190123 A1 | 7/2013 | Pohl et al. |
| 2013/0288844 A1 | 10/2013 | Thomassy |
| 2013/0288848 A1 | 10/2013 | Carter et al. |
| 2013/0310214 A1 | 11/2013 | Pohl et al. |
| 2013/0324344 A1 | 12/2013 | Pohl et al. |
| 2013/0331218 A1 | 12/2013 | Lohr et al. |
| 2013/0337971 A1 | 12/2013 | Kostrup |
| 2014/0011619 A1 | 1/2014 | Pohl et al. |
| 2014/0011628 A1 | 1/2014 | Lohr et al. |
| 2014/0038771 A1 | 2/2014 | Miller |
| 2014/0073470 A1 | 3/2014 | Carter et al. |
| 2014/0121922 A1 | 5/2014 | Vasiliotis et al. |
| 2014/0128195 A1 | 5/2014 | Miller et al. |
| 2014/0141919 A1 | 5/2014 | Bazyn et al. |
| 2014/0144260 A1 | 5/2014 | Nichols et al. |
| 2014/0148303 A1 | 5/2014 | Nichols et al. |
| 2014/0179479 A1 | 6/2014 | Nichols et al. |
| 2014/0206499 A1 | 7/2014 | Lohr |
| 2014/0248988 A1 | 9/2014 | Lohr et al. |
| 2014/0257650 A1 | 9/2014 | Carter et al. |
| 2014/0323260 A1 | 10/2014 | Miller et al. |
| 2014/0329637 A1 | 11/2014 | Thomassy et al. |
| 2014/0335991 A1 | 11/2014 | Lohr et al. |
| 2014/0365059 A1 | 12/2014 | Keilers et al. |

FOREIGN PATENT DOCUMENTS

| | | |
|---|---|---|
| CN | 1157379 A | 8/1997 |
| CN | 1281540 A | 1/2001 |
| CN | 1283258 | 2/2001 |
| CN | 1940348 | 4/2007 |
| DE | 498 701 | 5/1930 |
| DE | 1171692 | 6/1964 |
| DE | 2 310880 | 9/1974 |
| DE | 2 136 243 | 1/1975 |
| DE | 2436496 | 2/1975 |
| DE | 39 40 919 A1 | 6/1991 |
| DE | 19851738 A | 5/2000 |
| DE | 10155372 A1 | 5/2003 |
| EP | 0 432 742 | 12/1990 |
| EP | 0 528 381 | 2/1993 |
| EP | 0528382 | 2/1993 |
| EP | 635639 A1 | 1/1995 |
| EP | 0638741 | 2/1995 |
| EP | 0 832 816 | 4/1998 |
| EP | 0976956 | 2/2000 |
| EP | 1136724 | 9/2001 |
| EP | 1366978 | 3/2003 |
| EP | 1 433 641 | 6/2004 |
| EP | 1 624 230 | 2/2006 |
| EP | 1 811 202 | 7/2007 |
| FR | 620375 | 4/1927 |
| FR | 2460427 | 1/1981 |
| FR | 2590638 | 5/1987 |
| GB | 391448 | 4/1933 |
| GB | 592320 | 9/1947 |
| GB | 906 002 A | 9/1962 |
| GB | 919430 A | 2/1963 |
| GB | 1132473 | 11/1968 |
| GB | 1165545 | 10/1969 |
| GB | 1 376 057 | 12/1974 |
| GB | 2031822 | 4/1980 |
| GB | 2 035 482 | 6/1980 |
| GB | 2 080 452 | 8/1982 |
| JP | 44-1098 | 1/1944 |
| JP | 38-025315 | 11/1963 |
| JP | 41-003126 | 2/1966 |
| JP | 42-2843 | 2/1967 |
| JP | 42-2844 | 2/1967 |
| JP | 47-000448 | 7/1972 |
| JP | 47-29762 | 11/1972 |
| JP | 48-54371 | 7/1973 |
| JP | 49-12742 | 3/1974 |
| JP | 50-114581 | 9/1975 |
| JP | 51-25903 | 8/1976 |
| JP | 51-150380 | 12/1976 |
| JP | 47-20535 | 8/1977 |
| JP | 53 048166 | 1/1978 |
| JP | 55-135259 | 4/1979 |
| JP | 56-047231 | 4/1981 |
| JP | 56-127852 | 10/1981 |
| JP | 58065361 | 4/1983 |
| JP | 59069565 | 4/1984 |
| JP | 59-144826 | 8/1984 |
| JP | 60-247011 | 12/1985 |
| JP | 61-031754 | 2/1986 |
| JP | 61031754 | 2/1986 |
| JP | 61-053423 | 3/1986 |
| JP | 61-144466 | 7/1986 |
| JP | 61-173722 | 10/1986 |
| JP | 61-270552 | 11/1986 |
| JP | 62-75170 * | 4/1987 |
| JP | 63-219953 | 9/1988 |
| JP | 63219953 | 9/1988 |
| JP | 63-160465 | 10/1988 |
| JP | 01-286750 | 11/1989 |
| JP | 01-308142 | 12/1989 |
| JP | 02-130224 | 5/1990 |

(56) References Cited

FOREIGN PATENT DOCUMENTS

| | | |
|---|---|---|
| JP | 02157483 | 6/1990 |
| JP | 02271142 | 6/1990 |
| JP | 02-182593 | 7/1990 |
| JP | 03-223555 | 10/1991 |
| JP | 04-166619 | 6/1992 |
| JP | 04-272553 | 9/1992 |
| JP | 4-351361 | 12/1992 |
| JP | 5-87154 | 4/1993 |
| JP | 52-35481 | 9/1993 |
| JP | 06-050169 | 2/1994 |
| JP | 6-50358 | 2/1994 |
| JP | 7-42799 | 2/1995 |
| JP | 07-133857 | 5/1995 |
| JP | 7-139600 | 5/1995 |
| JP | 07-259950 | 10/1995 |
| JP | 08170706 A | 7/1996 |
| JP | 09024743 A | 1/1997 |
| JP | 09-089064 | 3/1997 |
| JP | 10-061739 | 3/1998 |
| JP | 10-115355 | 5/1998 |
| JP | 10-115356 | 5/1998 |
| JP | 10-194186 | 7/1998 |
| JP | 10-511621 | 11/1998 |
| JP | 411063130 | 3/1999 |
| JP | 11-257479 | 9/1999 |
| JP | 2000-46135 | 2/2000 |
| JP | 2001-27298 | 1/2001 |
| JP | 2001-071986 | 3/2001 |
| JP | 2001-107827 | 4/2001 |
| JP | 2001-165296 | 6/2001 |
| JP | 2001521109 A | 11/2001 |
| JP | 2002-147558 | 5/2002 |
| JP | 2002-250421 | 6/2002 |
| JP | 2002-307956 | 10/2002 |
| JP | 2002-372114 | 12/2002 |
| JP | 2003-028257 | 1/2003 |
| JP | 2003-56662 | 2/2003 |
| JP | 2003-161357 | 6/2003 |
| JP | 2003-524119 | 8/2003 |
| JP | 2003-336732 | 11/2003 |
| JP | 2004162652 A | 6/2004 |
| JP | 2004-189222 | 7/2004 |
| JP | 8-247245 | 9/2004 |
| JP | 2004-526917 | 9/2004 |
| JP | 2005-003063 | 1/2005 |
| JP | 2005/240928 A | 9/2005 |
| JP | 2006015025 | 1/2006 |
| JP | 2006-300241 | 11/2006 |
| JP | 2007-535715 | 12/2007 |
| JP | 2008-002687 | 1/2008 |
| JP | 03-149442 | 1/2009 |
| JP | 2010069005 | 4/2010 |
| NE | 98467 | 7/1961 |
| TW | 74007 | 1/1984 |
| TW | 175100 | 12/1991 |
| TW | 218909 | 1/1994 |
| TW | 227206 | 7/1994 |
| TW | 275872 | 5/1996 |
| TW | 360184 | 6/1999 |
| TW | 366396 | 8/1999 |
| TW | 512211 | 12/2002 |
| TW | 582363 | 4/2004 |
| TW | 590955 | 6/2004 |
| TW | I225129 | 12/2004 |
| TW | I225912 | 1/2005 |
| TW | I235214 | 1/2005 |
| TW | M294598 | 7/2006 |
| TW | 200637745 | 11/2006 |
| WO | WO 99/20918 | 4/1999 |
| WO | WO 01/73319 | 10/2001 |
| WO | WO 02/088573 | 11/2002 |
| WO | WO 03100294 | 12/2003 |
| WO | WO 2005/083305 | 9/2005 |
| WO | WO 2005/108825 | 11/2005 |
| WO | WO 2005/111472 | 11/2005 |
| WO | WO 2006/091503 | 8/2006 |
| WO | WO 2007/133538 | 11/2007 |
| WO | WO 2007/133681 | 11/2007 |
| WO | WO 2008/002457 | 1/2008 |
| WO | WO 2008/057507 | 5/2008 |
| WO | WO 2008/078047 | 7/2008 |
| WO | WO 2008/095116 | 8/2008 |
| WO | WO 2008/100792 | 8/2008 |
| WO | WO 2008/101070 | 8/2008 |
| WO | WO 2008/131353 | 10/2008 |
| WO | WO 2008/154437 | 12/2008 |
| WO | WO 2009/065057 | 5/2009 |
| WO | WO 2009/148461 | 12/2009 |
| WO | WO 2009/157920 | 12/2009 |
| WO | WO 2010/017242 | 2/2010 |
| WO | WO 2010/135407 | 11/2010 |
| WO | WO 2011/101991 | 8/2011 |
| WO | WO 2012/030213 | 3/2012 |
| WO | WO 2013/112408 | 8/2013 |

OTHER PUBLICATIONS

Thomassy: An Engineering Approach to Simulating Traction EHL. CVT-Hybrid International Conference Mecc/Maastricht/The Netherlands, Nov. 17-19, 2010, p. 97.

International Search Report and Written Opinion dated Feb. 2, 2010 from International Patent Application No. PCT/US2008/068929, filed on Jan. 7, 2008.

Office Action dated Feb. 12, 2010 from Japanese Patent Application No. 2009-294086.

Office Action dated Feb. 17, 2010 from Japanese Patent Application No. 2006-508892.

Office Action dated Jul. 10, 2012 for U.S. Appl. No. 12/514,062.

Office Action dated Mar. 1, 2012 for U.S. Appl. No. 12/514,062.

International Search Report and Written Opinion dated Aug. 6, 2009 for PCT Application No. PCT/US2009/035540.

Japanese Office Action dated Aug. 6, 2013 for Japanese Patent Application No. 2011-524950.

Office Action dated May 28, 2013 in Japanese Patent Application No. 2012-095839.

Office Action dated Aug. 12, 2013 for Taiwanese Patent Application No. 095143152.

Preliminary Notice of First Office Action dated Sep. 14, 2013 in Taiwan Patent Application No. 96142183.

Notification of Reasons for Refusal dated Jan. 28, 2014 in Japanese Patent Application No. 2012-506182.

Preliminary Notice of First Office Action dated Jan. 23, 2014 in Taiwanese Patent Application No. 097114878. .

First Office Action date Jul. 30, 2014 in Taiwan Patent Application No. 96142183.

\* cited by examiner

DETAIL A

DETAIL B

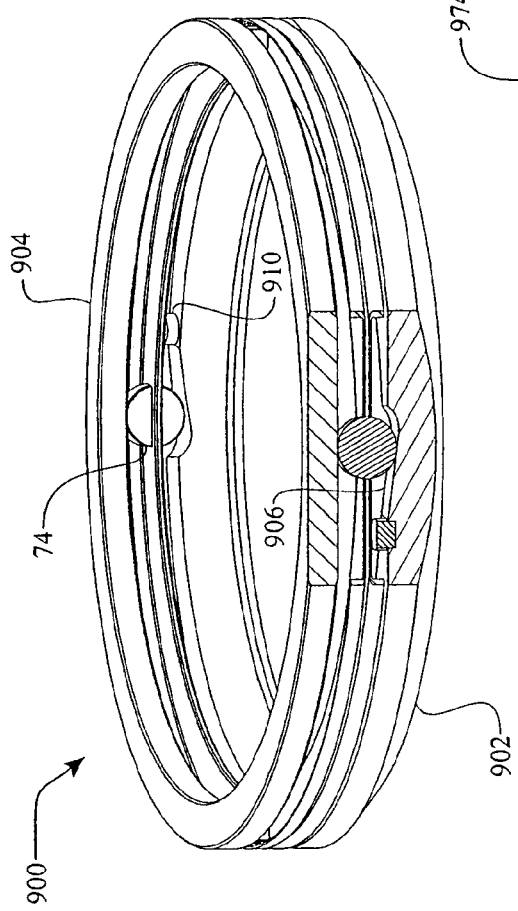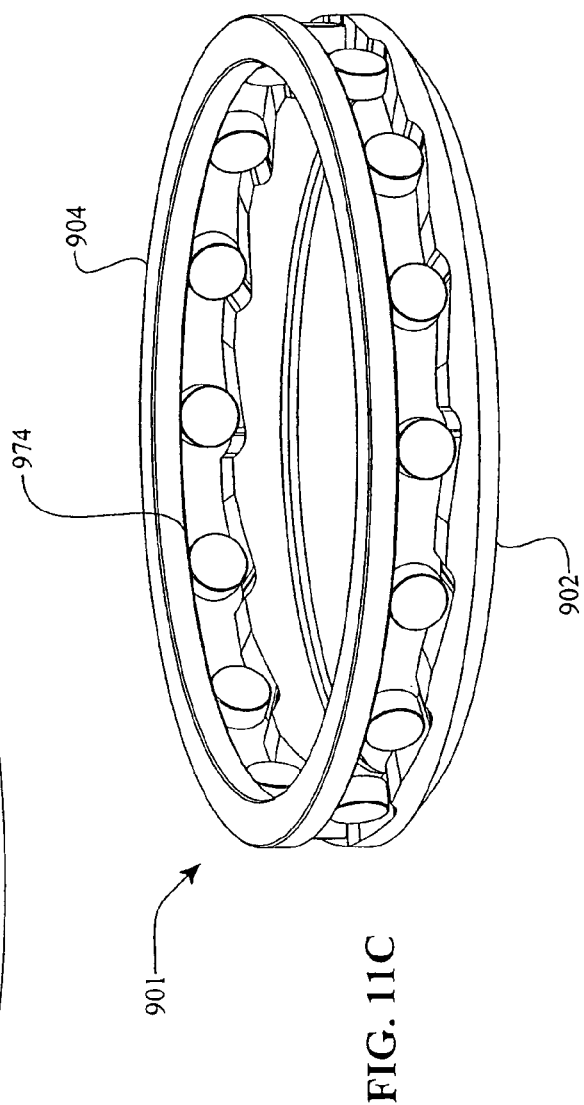

DETAIL C

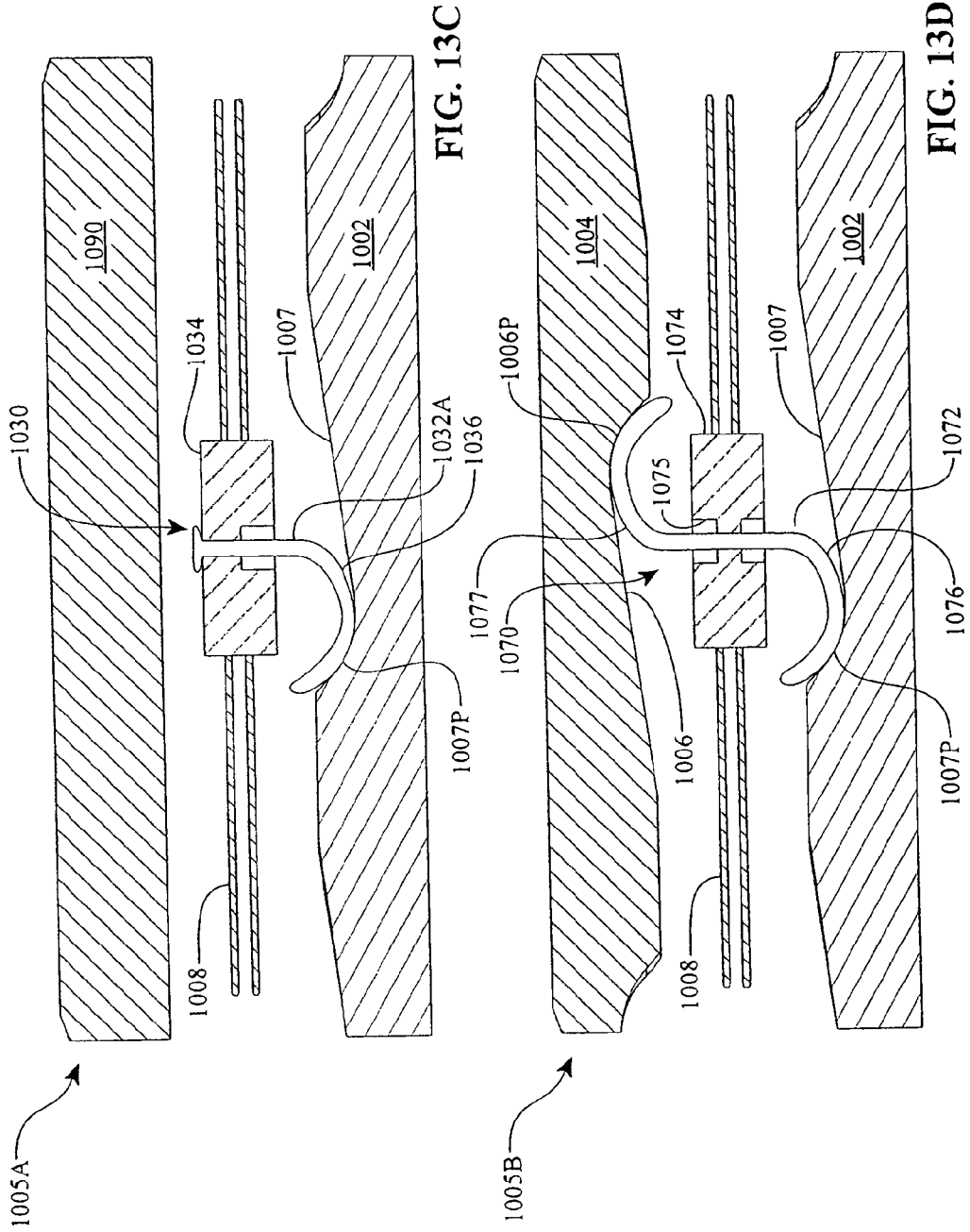

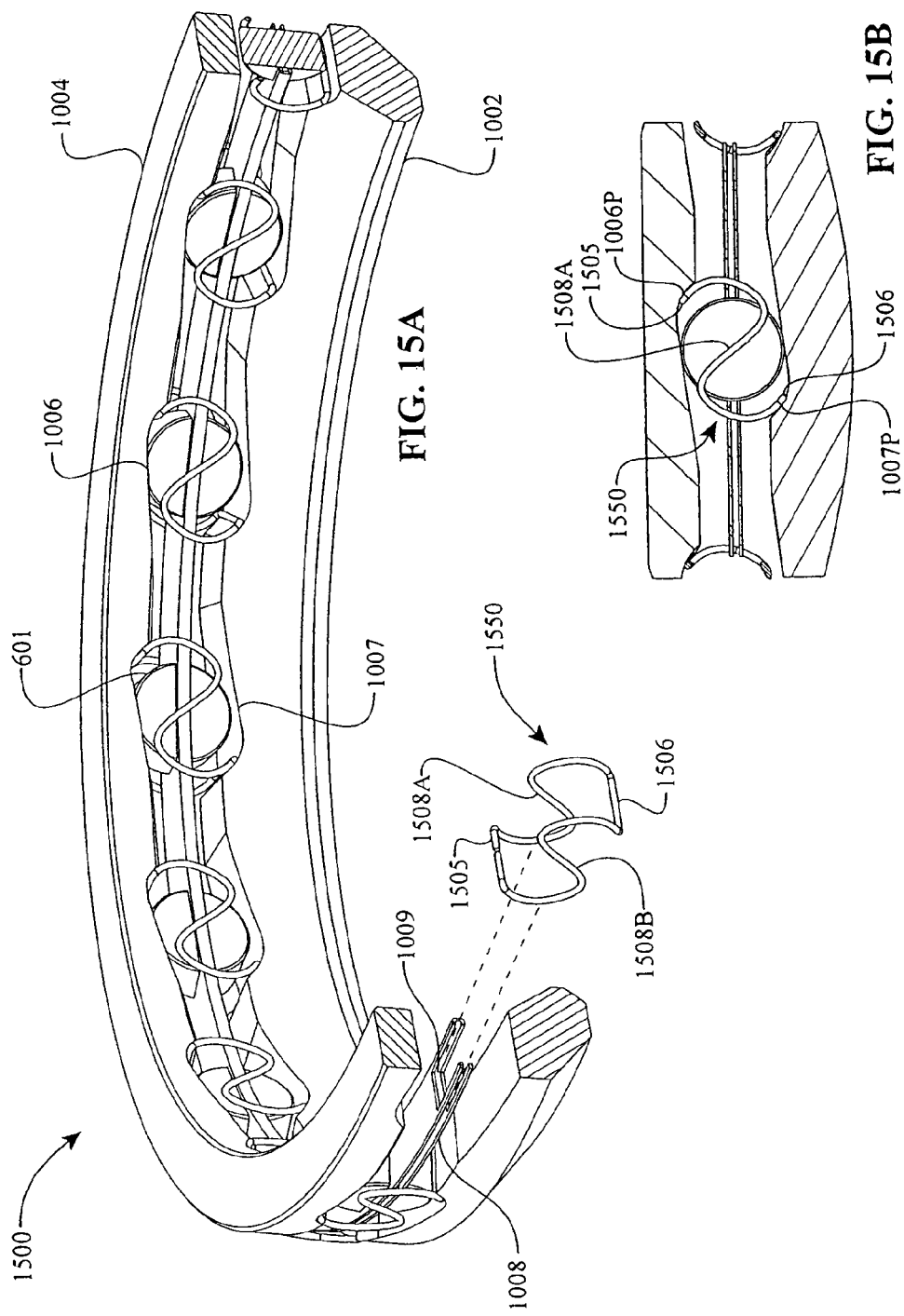

DETAIL D

CLAMPING FORCE GENERATOR

RELATED APPLICATIONS

This application is a continuation of U.S. patent application Ser. No. 12/514,062, filed May 7, 2009, which is a national phase application of Application No. PCT/US2007/023315, filed Nov. 6, 2007, which claims the benefit of U.S. Provisional Application No. 60/864,941, filed Nov. 8, 2006. The disclosures of all of the above-referenced prior applications, publications, and patents are considered part of the disclosure of this application, and are incorporated by reference herein in their entirety.

BACKGROUND OF THE INVENTION

1. Field of the Invention

The field of the invention relates generally to mechanical power transmissions, and more particularly the invention pertains to devices and methods relating to generating clamping force in certain types of said transmissions.

2. Description of the Related Art

Certain transmissions, for example some continuously or infinitely variable transmissions, often include one or more mechanisms for generating a clamping force that facilitates the transmission of torque between or among transmission components via traction or friction. Some clamping force generators are referred to as axial force generators (AFGs) because, typically, the clamping force produced by the AFGs resolves (or must be reacted) along a main or longitudinal axis of a transmission. Hence, as used here, references to clamping force generation or clamping force generators will be understood as including axial force generation or AFGs.

One known method of generating clamping force is to place rollers between a set of load cams (or load ramps) and a reacting surface, such as for example another set of load cams or a flat driven or driving surface. As the relative motion between the opposing surfaces drives the rollers up the ramps, the rollers act to push apart the opposing surfaces. Since the opposing surfaces are typically substantially constrained to react the pushing of the rollers, a clamping force arises in the assembly. The clamping force is then usually transmitted to tractive or frictional torque transmission components.

However, devising the proper clamping force generator for any given application can be challenging. For example, difficulties can arise in providing the adequate pre-load (or initial clamping force) necessary to avoid total traction loss and/or inefficiencies (due to lost motion, for example). Hence, there are continuing needs in the relevant technology for clamping force generating mechanisms and/or methods to provide adequate clamping force for various operating conditions of certain transmissions. The devices and methods disclosed here address at least some of these needs.

BRIEF DESCRIPTION OF THE FIGURES

FIG. 11B is a partially sectioned, perspective view of yet another CFG.

FIG. 11C is a perspective view of yet another CFG.

FIG. 13C is a cross-sectional view of certain components of another CFG.

FIG. 13D is a cross-sectional view of certain components of another CFG.

FIG. 15A is a partially sectioned, perspective view of yet another CFG which can be used in transmissions such as the CVT of FIG. 1.

FIG. 15B is a cross-sectional view of certain components of the CFG of FIG. 15A.

DETAILED DESCRIPTION OF CERTAIN INVENTIVE EMBODIMENTS

The preferred embodiments will now be described with reference to the accompanying figures, wherein like numerals refer to like elements throughout. The terminology used in the description presented herein is not intended to be interpreted in any limited or restrictive manner simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described. Embodiments of the clamping force generators described here can be suitably adapted to continuously variable transmissions of the type disclosed in U.S. Pat. Nos. 6,241,636; 6,419,608; 6,689,012; and 7,011,600. The entire disclosure of each of these patents is hereby incorporated herein by reference.

As used here, the terms "operationally connected," "operationally coupled", "operationally linked", "operably connected", "operably coupled", "operably linked," and like terms, refer to a relationship (mechanical, linkage, coupling, etc.) between elements whereby operation of one element results in a corresponding, following, or simultaneous operation or actuation of a second element. It is noted that in using said terms to describe inventive embodiments, specific structures or mechanisms that link or couple the elements are typically described. However, unless otherwise specifically stated, when one of said terms is used, the term indicates that the actual linkage or coupling may take a variety of forms, which in certain instances will be readily apparent to a person of ordinary skill in the relevant technology.

As used here, the terms "axial," "axially," "lateral," "laterally," refer to a position or direction that is coaxial or parallel with a longitudinal axis of a transmission or variator. The terms "radial" and "radially" refer to locations or directions that extend perpendicularly from the longitudinal axis. For clarity and conciseness, at times components labeled similarly (for example, spring 112A and spring 112B) will be referred to collectively by a single label (for example, springs 112).

Figure 1:
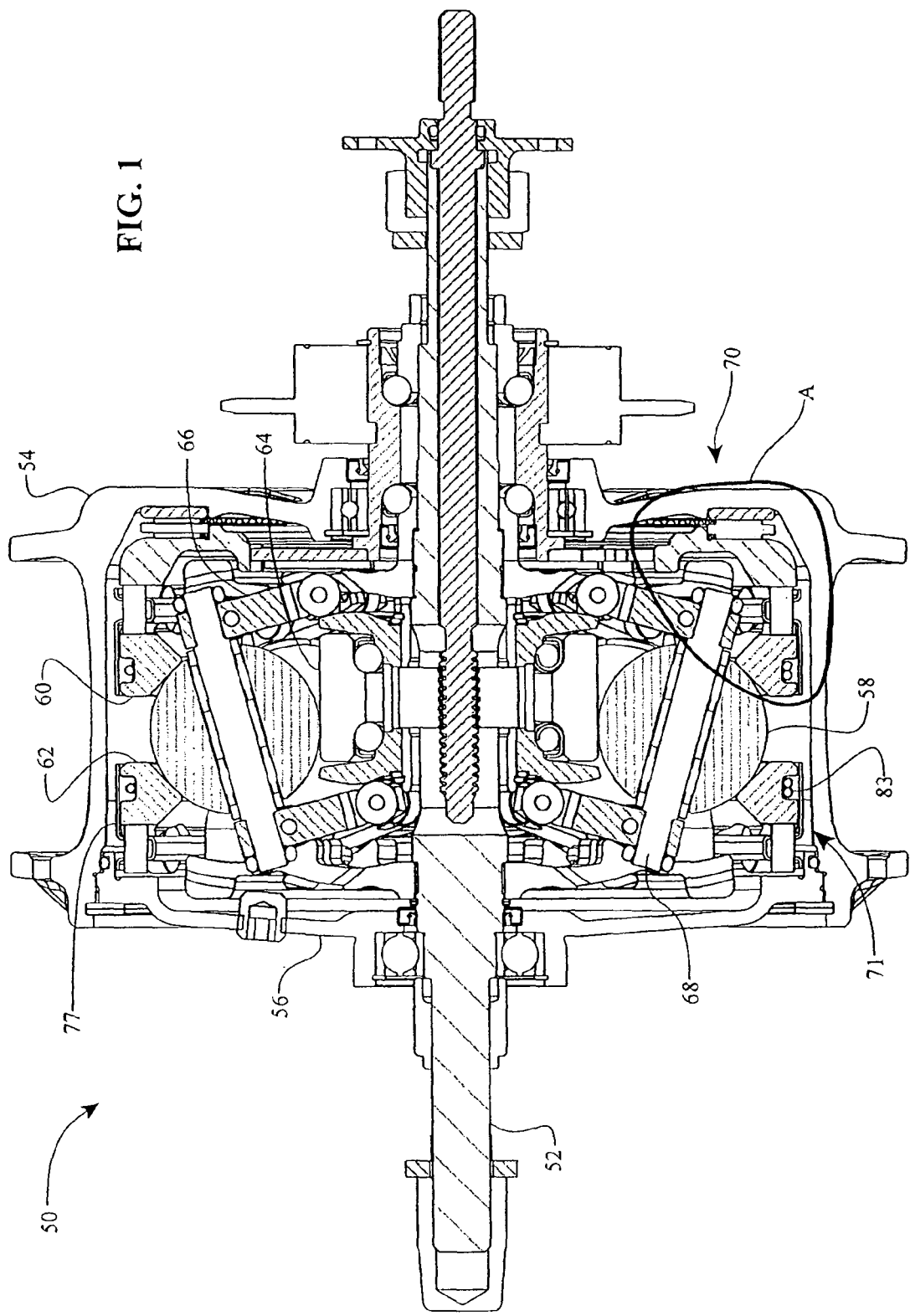
FIG. 1 is a cross-section of an exemplary continuously variable transmission (CVT) that uses a clamping force generation mechanism (CFG).

To provide context for the inventive clamping force generation technologies disclosed here, one type of transmission that could implement these technologies will be discussed. Referencing FIG. 1 now, it illustrates a spherical-type CVT 50 that can be used to change the ratio of input speed to output speed. The CVT 50 has a main axle 52 extending through the center of the CVT 50. The main axle 52 provides axial and radial positioning and support for other components of the CVT 50. For purposes of description, the main axle 52 defines a longitudinal axis of the CVT 50 that will serve as a reference point for describing the location and or motion of other components of the CVT 50.

The CVT 50 includes a hub shell 54 that couples to a hub cover 56. The hub shell 54 and the hub cover 56 forms a housing. The CVT 50 includes a number of power rollers 58 arranged angularly about the main axle 52 and placed in contact with an input traction ring 60, an output traction ring 62, and a support member 64. Legs 66 couple to power roller axles 68, which provide tiltable axes of rotation for the power rollers 58. The tilting of the power roller axles 68 causes the radii (relative to the power roller axles 68) at the point of contact between the power rollers 58 and the traction rings 60, 62 to change, thereby changing the speed ratio of output speed to input speed.

Embodiments of the CVT 50 often use a clamping force generation mechanism (clamping force generator or CFG) to prevent slip between the power rollers 58 and the traction rings 60, 62 when transmitting certain levels of torque. By way of example, at low torque input it is possible for the input ring 60 to slip on the power rollers 58, rather than to achieve traction. In some embodiments, clamping force generation includes providing preloading, such as by way of one or more of an axial spring (for example, a wave spring); a torsion spring, a compression coil spring, or a tension coil spring.

Figure 2:
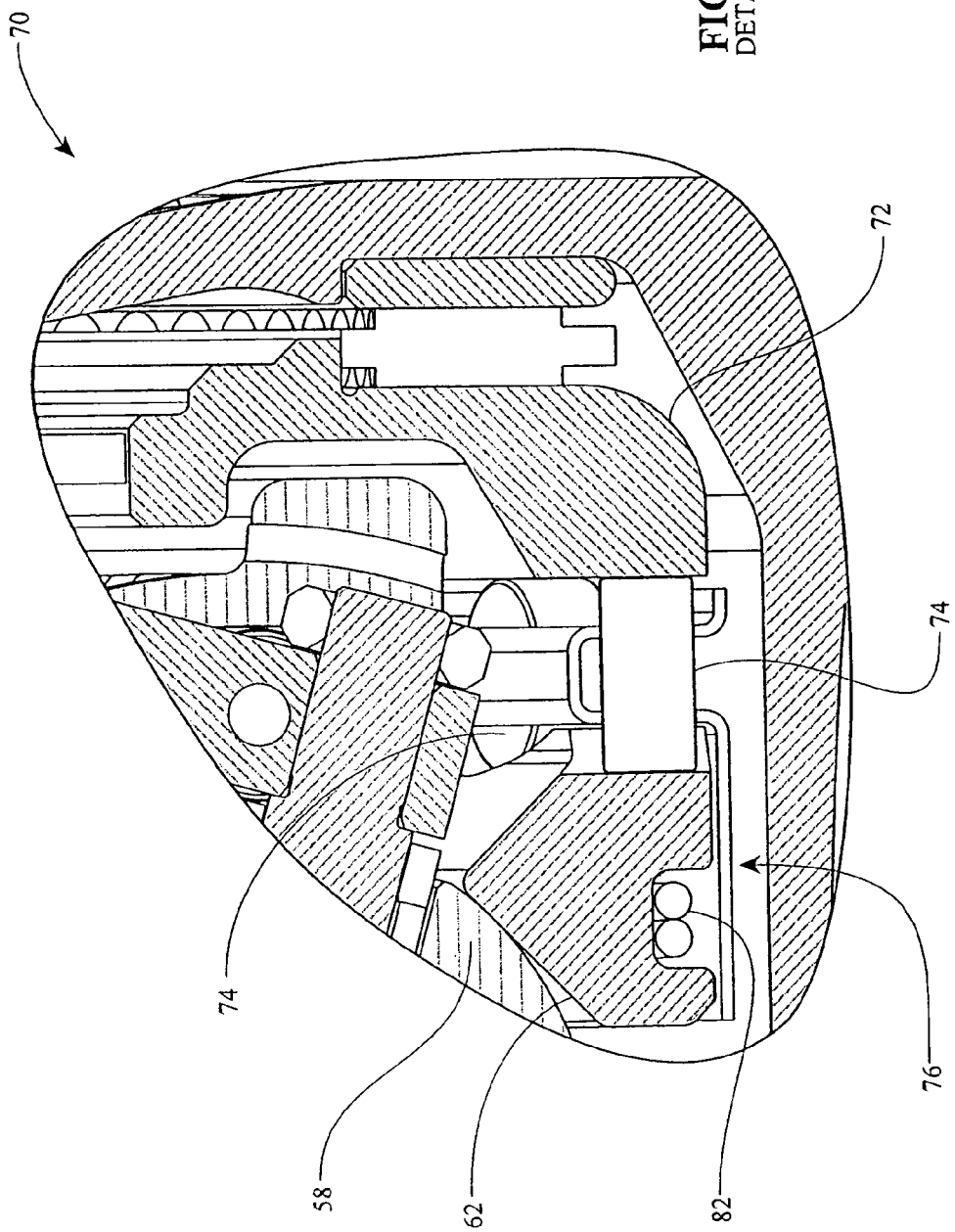
FIG. 2 is a detailed view A of the CVT of FIG. 1.
Figure 3:
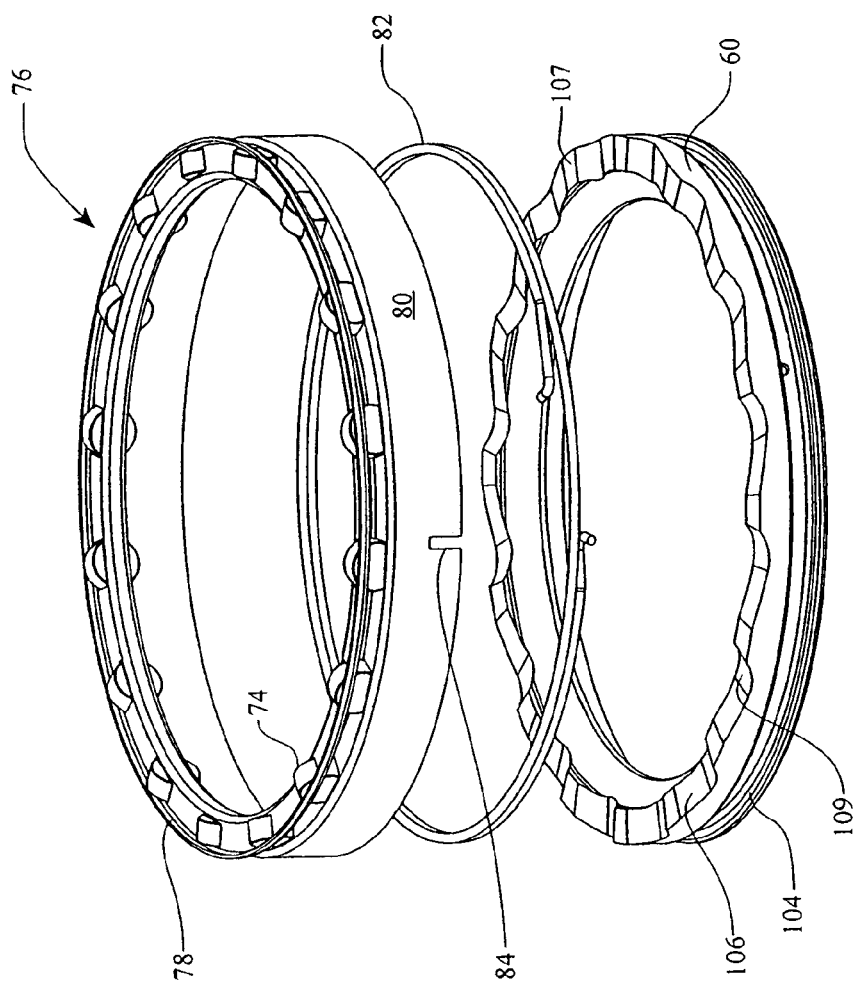
FIG. 3 is an exploded assembly view of certain components of a CFG that can be used in the CVT of FIG. 1.

In one embodiment, the CVT 50 includes an input-side clamping force generation subassembly 70 (CFG 70) as shown in detail view A. Referencing FIGS. 1-3 now, the CFG 70 includes a cam driver 72 in contact with a number of load cam rollers 74. The load cam rollers 74 are positioned and supported by a roller cage 76. The load cam rollers 74 also contact a set of ramps 106 that are, in this embodiment, integral with the input traction ring 60. As the cam driver 72 rotates about the main axle 52, the cam driver 72 causes the load cam rollers 74 to ride up the ramps 106. This roll-up action energizes the load cam rollers 74 and thereby generates a clamping force, as the load cam rollers 74 are compressed between the cam driver 72 and the ramps 106. The clamping force serves to urge the input traction ring 60 against the power rollers 58.

The roller cage 76 includes a roller retainer ring 78 adapted to receive and retain the load cam rollers 74. The roller retainer ring 78 transitions into a retainer extension 80, which is a generally annular ring extending from the roller retaining ring 78 at an angle of about 90 degrees. The roller retainer extension 80, in some embodiments, is adapted to pilot on the traction ring 60 to, in part, aid in retaining a torsion spring 82 in a spring groove 104 of the traction ring 60. In the embodiment depicted, the retainer extension 80 includes a retaining slit 84 for receiving and retaining an end of the torsion spring 82.

To ensure appropriate preloading of the CVT 50, and initial staging of the load cam rollers 74 for clamping force generation during operation, in some embodiments, the depth of the spring groove 104, the pitch diameter of the torsion spring 82 in its free state, the length and wire diameter of the torsion spring 82, and the internal diameter of the retainer extension 80 are selected such that expansion of the torsion spring 82 in the spring groove 104 is constrained by the retainer extension 80 so that a partially wound torsion spring 82 biases the roller cage 76 to cause the load cam rollers 74 to roll up the ramps 106 and come to rest on or near a substantially flat portion 107 of the traction ring 60.

Upon assembly of the CVT 50, the roller cage 76 is turned relative to the traction ring 60, thereby winding the torsion spring 82 until the load cam rollers 74 come to rest substantially at a bottom portion 109 of the ramps 106. This assembly process ensures, among other things, that the torsion spring 82 is preloaded to bias the load cam rollers 74 up the ramps 106 so that the load cam rollers 74 are properly staged for activation during operation of the CVT 50. Additionally, this component configuration and assembly process facilitates the take up of stack up tolerances present during assembly of the CVT 50.

To manage and/or minimize slip or creep at the contact points between the power rollers 58, the traction rings 60, 62, and the support member 64, in some embodiments of the CVT 50, the input CFG 70 and an output CFG 71 are used. To reduce the response time and to ensure sufficient contact force at low torque input, the torsion springs 82, 83 act upon, respectively, the input traction ring 60 and the roller cage 76, and the output traction ring 84 and the roller cage 77 (see FIG. 1), to provide a certain amount of clamping of the traction rings 60, 62 against the power rollers 58.

In certain situations, it is possible that the retainer extension 80 of the roller cage 76 interacts with the traction ring 60 and/or the torsion spring 82 to produce an undesired drag force in the CVT 50. The clamping force generation mechanisms described below generally reduce or eliminate the potential for generating the drag force.

Figure 4:
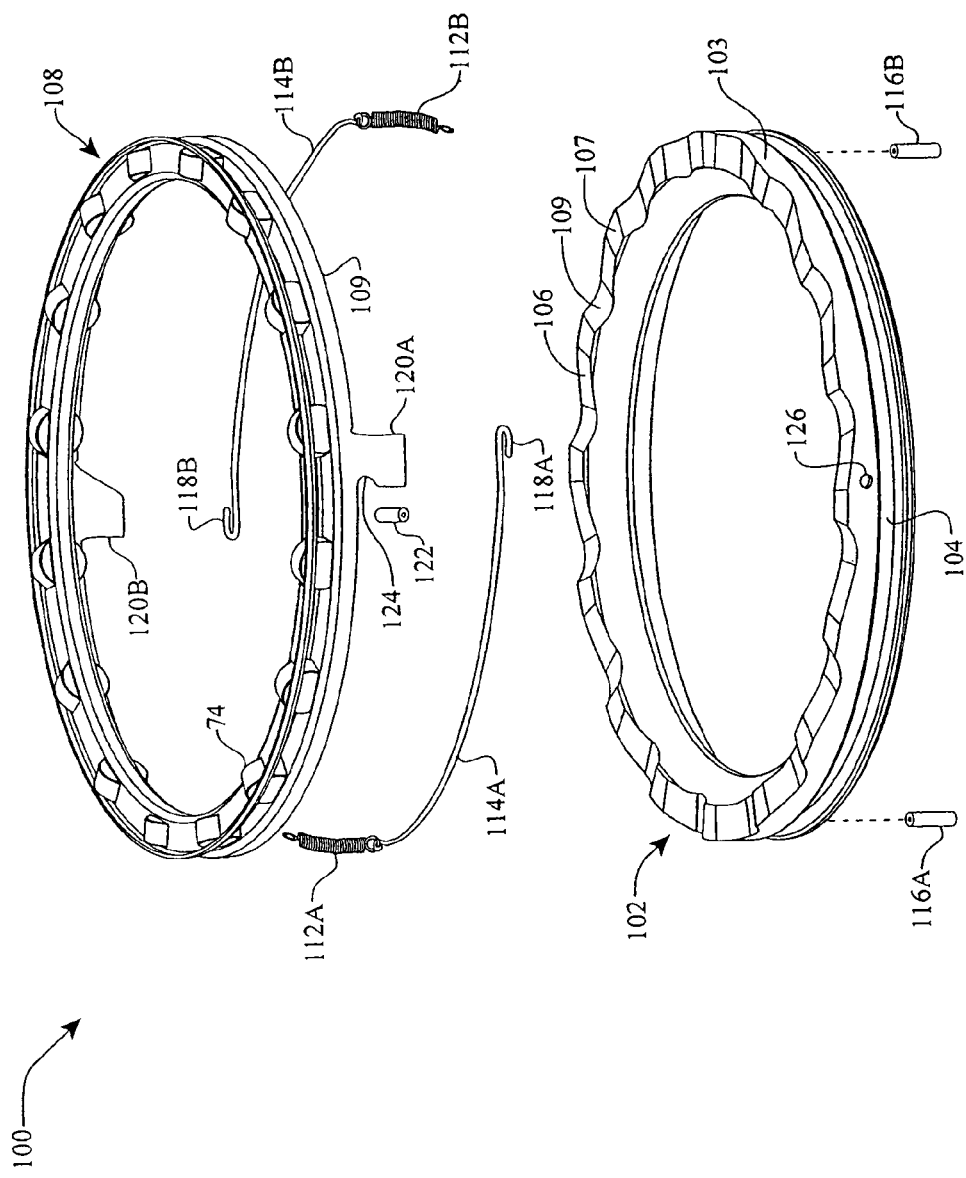
FIG. 4 is an exploded assembly view of another CFG, which can be used in transmissions such as the CVT of FIG. 1.
Figure 5:
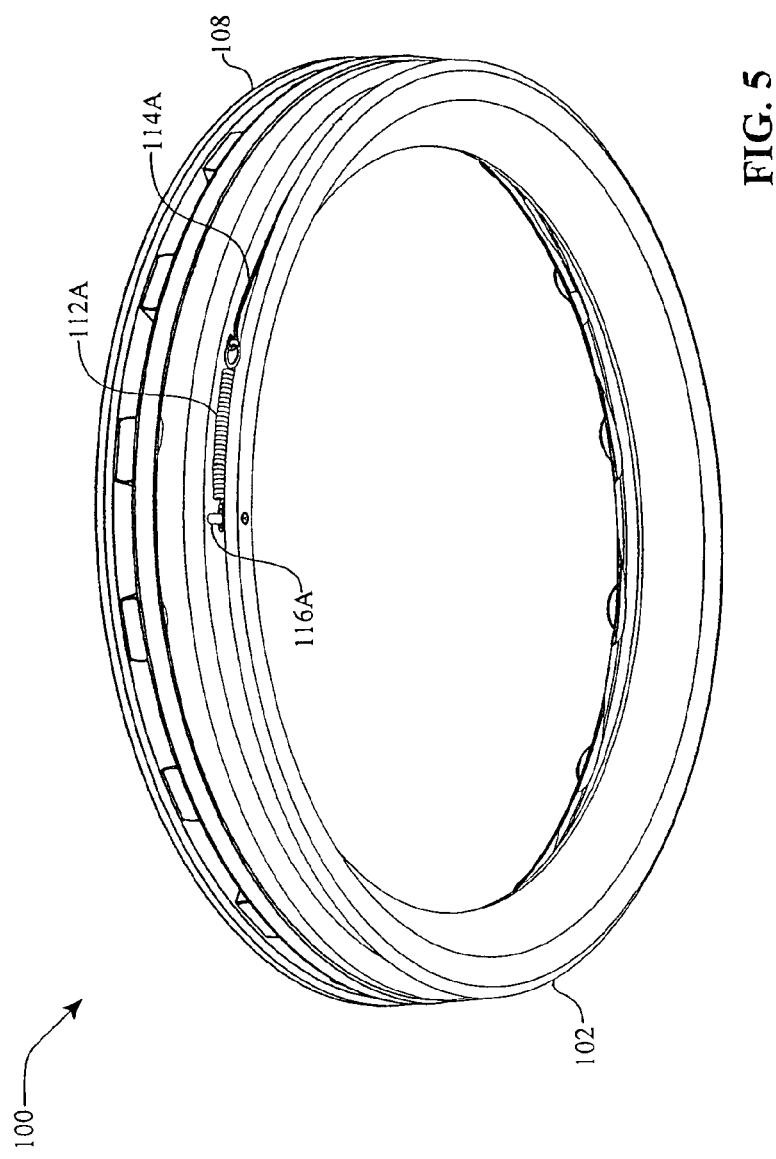
FIG. 5 is a perspective view of the CFG of FIG. 4.

Referencing FIG. 4 now, a CFG 100 can include a traction ring 102 having a spring groove 104 and a set of ramps 106. In one embodiment, the CFG 100 includes a roller cage 108 that holds and supports a group of load cam rollers 74, which can be cylindrical rollers, spherical rollers, or barrel-shaped rollers, for example. The roller cage 108 can be fitted with an extension or flange 109 that fits over an outer diameter 103 of the traction ring 102. In the embodiment of FIG. 4, the CFG 100 includes one or more of springs 112 and wires 114. As shown in FIG. 5, the springs 112 and the wires 114 are placed in the spring groove 104. The springs 112 can be coil springs of the compression or tension type, for example.

Figure 6:
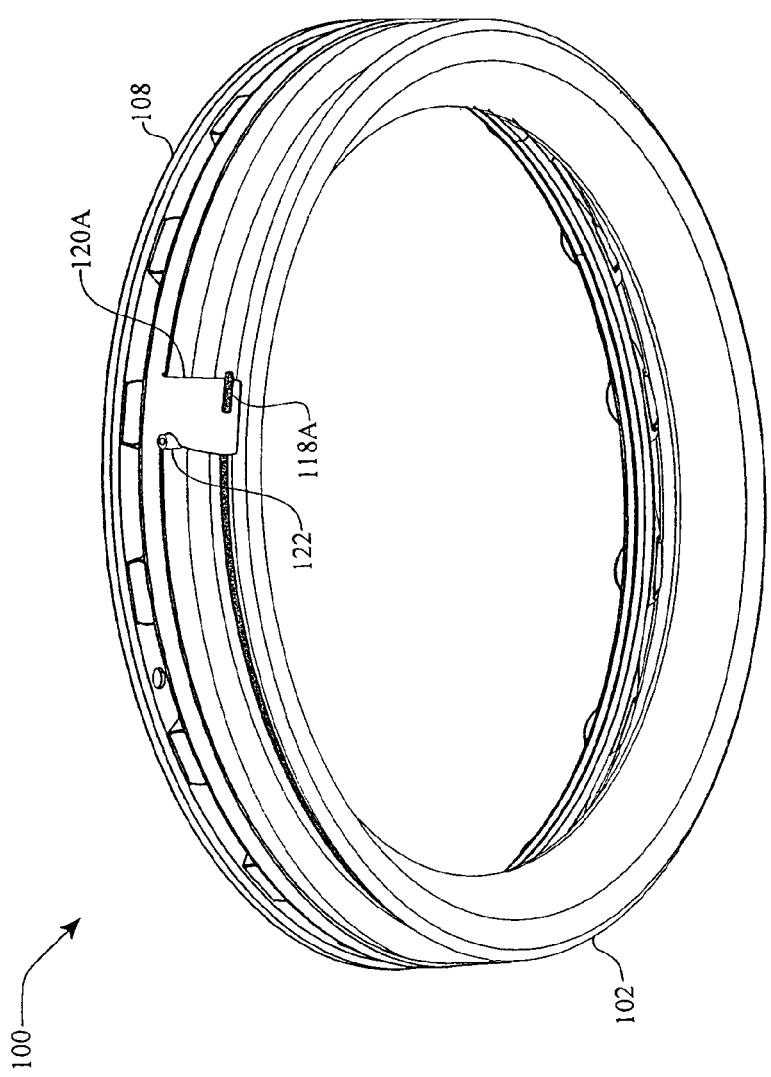
FIG. 6 is a second perspective view of the CFG of FIG. 4.

In one embodiment, one end of the spring 112A couples to the traction ring 102 via a dowel pin 116A, which is inserted through suitable holes in the traction ring 102. The other end of the spring 112A couples to one end of the wire 114A. As can be best seen in FIG. 6, another end of the wire 114A is provided with a bend or hook 118A configured to engage a tab 120A of the roller cage 108. In some embodiments, the CFG 100 includes a stop pin 122 suitably configured to engage the tab 120A at a tab notch 124 (see FIG. 4). The traction ring 102 can be provided with a hole 126 for receiving and supporting the stop pin 122. Similarly, in some embodiments, the spring 112B couples to the wire 114B and, via a dowel pin 116B, to the traction ring 102. A hook 118B of the wire 114B engages the tab 120B.

Figure 7:
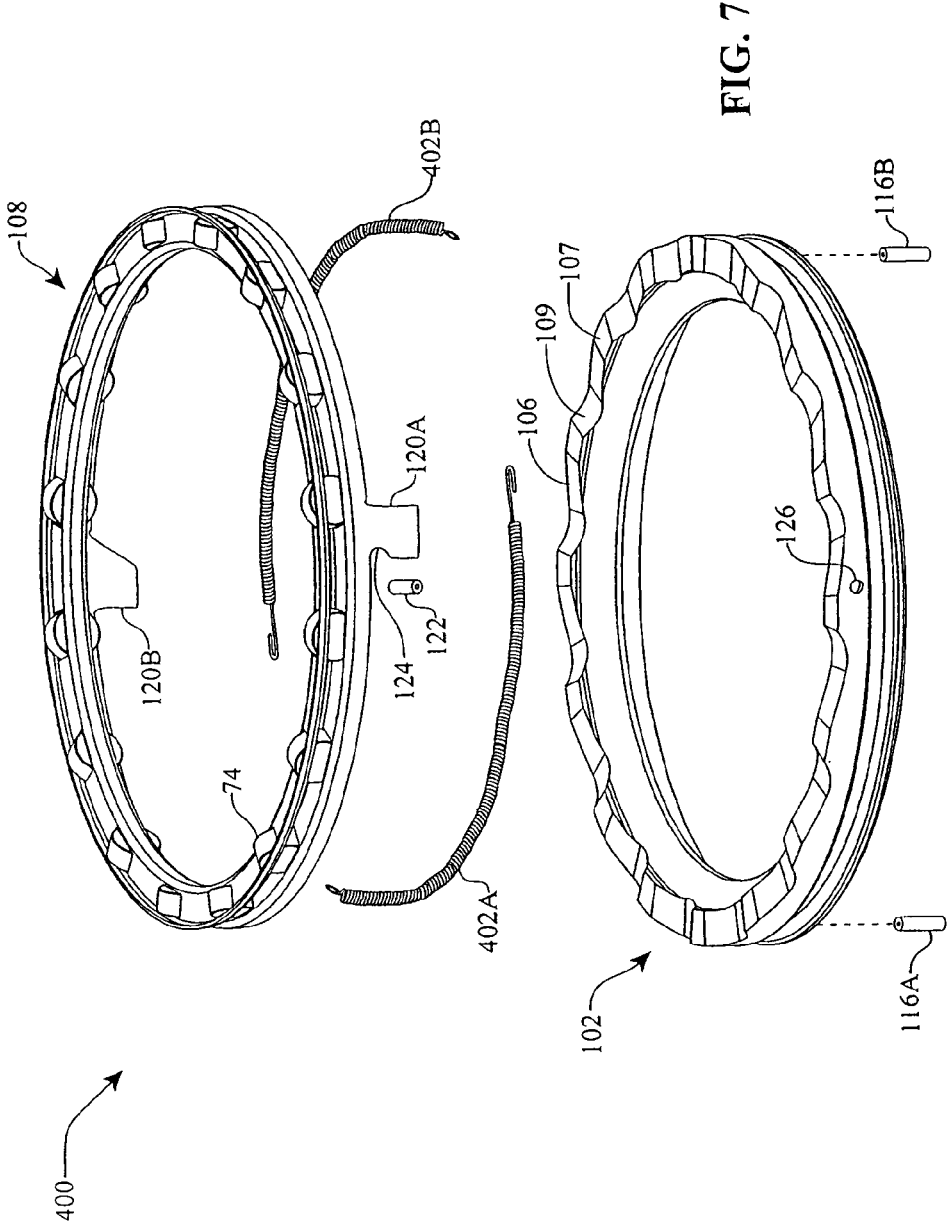
FIG. 7 is an exploded assembly view of yet another CFG.
Figure 8:
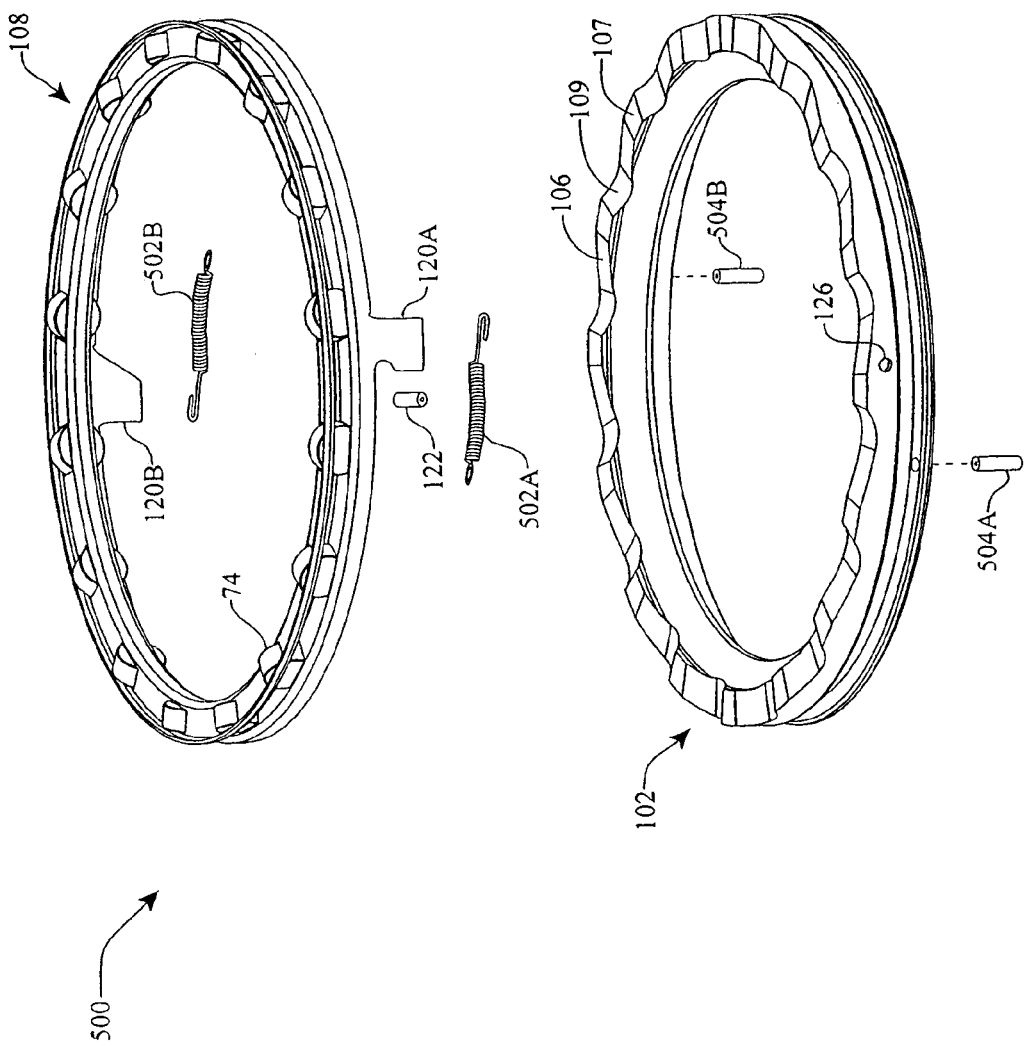
FIG. 8 is an exploded assembly view of still another CFG.

As illustrated in FIG. 7, in another embodiment, a CFG 400 can include the traction ring 102 and the roller cage 108, as well as other components of the CFG 100. However, in the embodiment shown in FIG. 7, the CFG 400 uses springs 402 instead of the springs 112 and the wires 114. FIG. 8 shows yet another embodiment of a CFG 500 that uses relatively short spring 502 instead of the longer springs 402.

During assembly and operation of a CVT 50, the CFGs 100, 400, and 500 are assembled and operated in substantially the same manner as already described above with reference to the CFG 70. More specifically, for example, the springs 112 and the stop pin 122 are configured such that the springs 112 bias the roller cage 108 and the load cam rollers 74 to be initially staged at or in the vicinity of the flat surfaces 107 of the traction ring 102. Preferably as the CVT 50 is assembled, the roller cage 108 is rotated so that the load cam rollers 74 are positioned substantially at the bottom portion 109 of the ramps 106. The springs 112 will then act upon the roller cage 108 to cause the load cam rollers 74 to roll back up the ramps 106 for some distance to produce a preload that ensures that a certain minimum level of clamping force will be always available during operation of the CVT 50.

While the springs 114, 402, and 502 of some embodiments are made of any resilient material capable of being formed into a spring, in certain applications, the springs 114, 402, and 502 are made of, for example, metal, rubber, composite, plastic, etc. In one embodiment, the springs 114 are general use extension springs such as spring SP-9606 distributed by Prime-Line Product Company of San Bernardino, Calif., USA. The spring SP-9606 has a length of about 2.5 inches, an outer diameter of about 5/32", and wire diameter of about 0.02 inches. Preferably, the springs 114 have a load capacity of about 1.5 to 3.5 pounds. In some embodiments, the wires 114 are made of a metallic material; however, in other embodiments, the wires 114 are made any other suitable material, such as rubber, composite, plastic, etc.

Figure 9A:
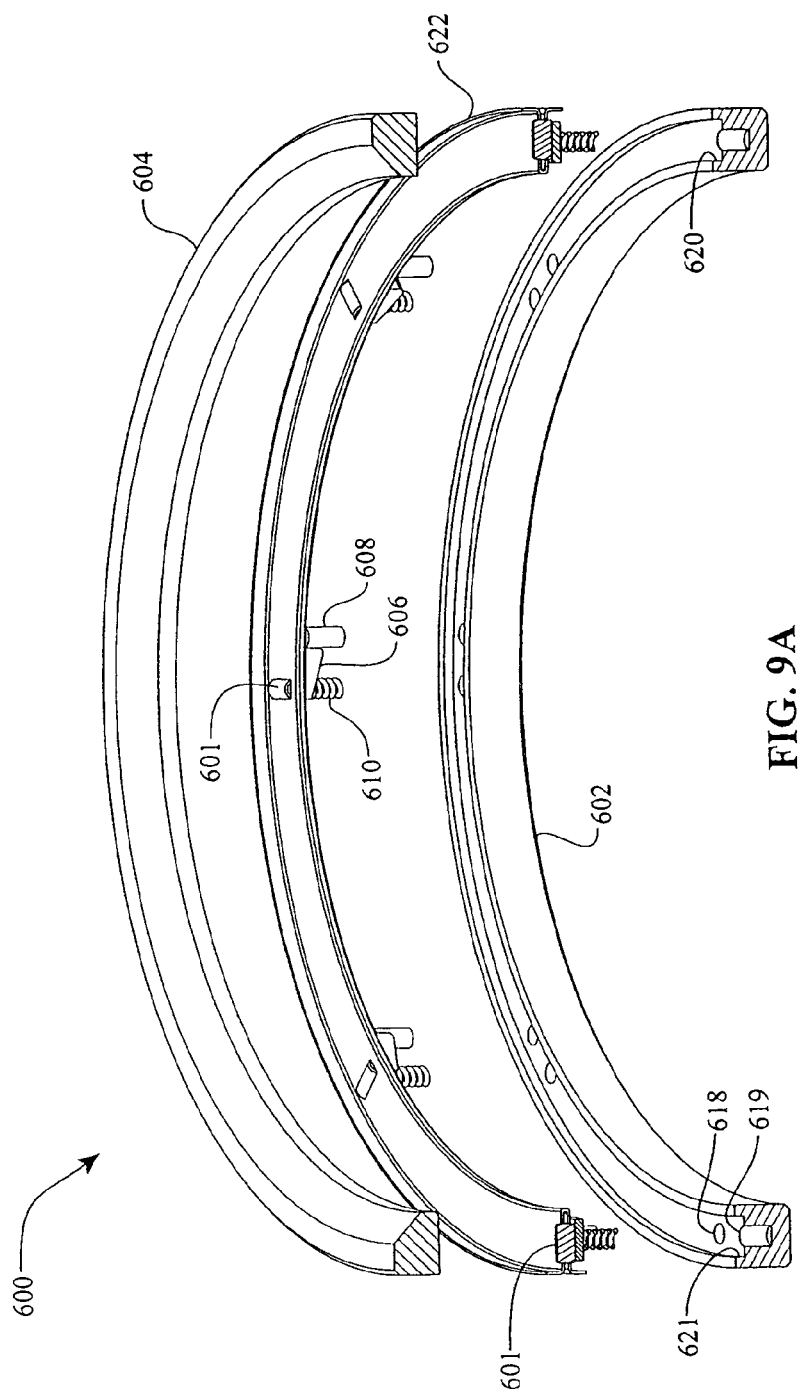
FIG. 9A is a cross-sectioned, exploded assembly view of a CFG having spring loaded ramps.
Figure 9B:
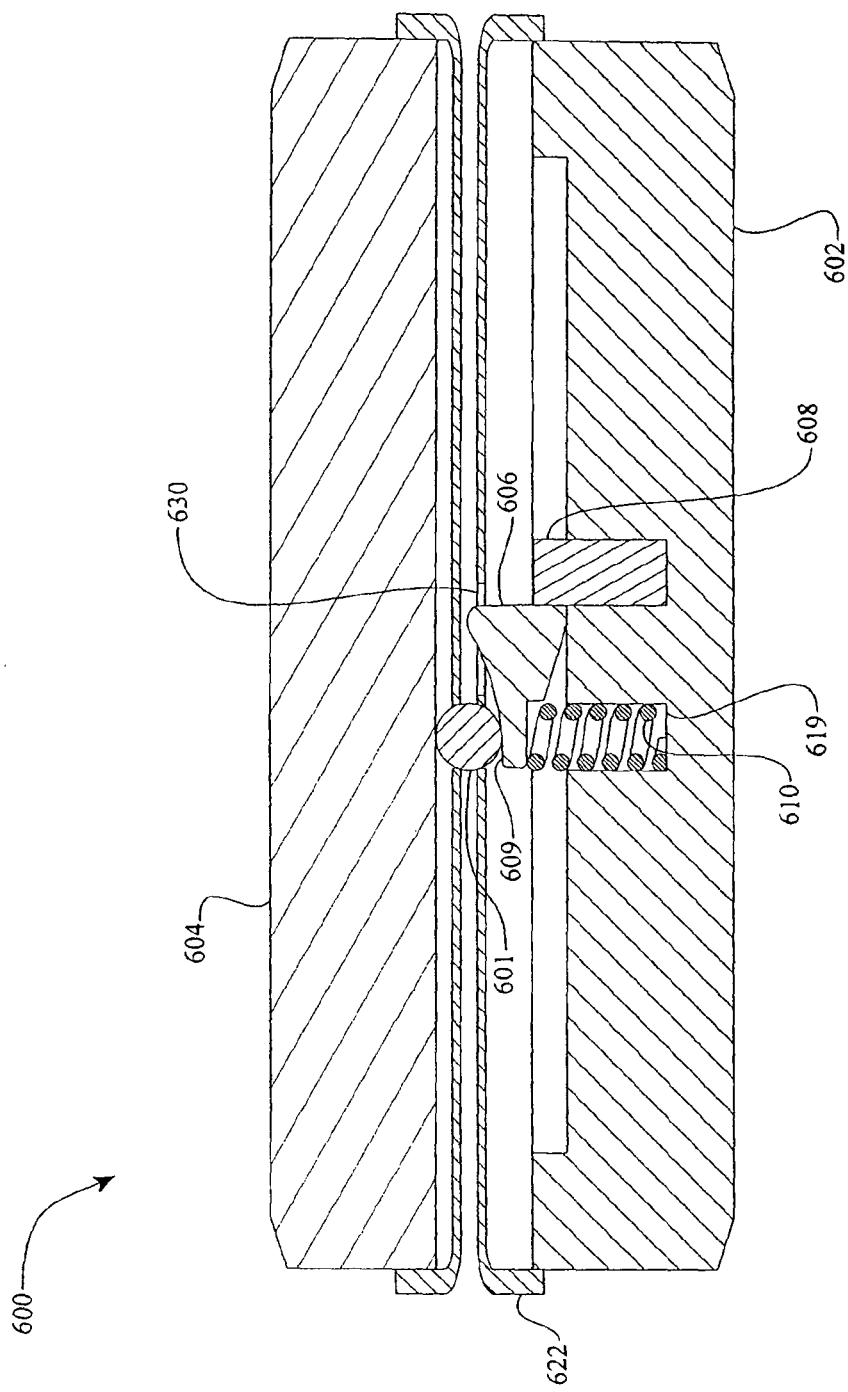
FIG. 9B is a cross-sectional view of the CFG of FIG. 9A.

Referring now to FIGS. 9A and 9B, in one embodiment a CFG 600 can include a cam base ring 602, a traction ring 604, and a number of spring loaded ramps 606 in contact with load cam rollers 601. The load cam rollers 601 are arranged and retained in a cam roller cage 622. In some embodiments, the cam roller cage 622 is substantially similar to the cam roller cage 76. A portion of the spring loaded ramps 606 can be retained in, supported by, and/or reacted by the cam roller cage 622 by, for example, a slot 630 of the cam roller cage 622. The base ring 602 can be an annular ring similar to, for example, the cam driver 72. A number of torque transferring shoulders 608 can be arranged on the cam base ring 602 and couple one end of the spring loaded ramps 606. A number of springs 610 can be arranged on the cam base ring 602 so that one end of the spring loaded ramps 606 is coupled to the springs 610. Generally, the torque transferring shoulder 608 couples to one end of the spring loaded ramp 606 and the spring 610 couples to the other end of the spring loaded ramp 606. The springs 610 can be coil springs of the compression type, for example. The spring loaded ramp 606 can be configured to have a profile substantially similar to the ramps 106 and have, for example, a flat surface 609 in contact with cam roller 601. The spring loaded ramp 606 can be made from hardened steel, powdered metal, or other suitable material for withstanding the loads and stresses imposed on the CFG 600 during operation of CVT 50. The torque transferring shoulders 608 can be integral to the cam base ring 602 or, for example, be formed with dowels pressed into bores or slots such as bores 618 on the cam base ring 602. The latter may accommodate alternative manufacturing processes. Similarly, springs 610 can be retained in pockets or bores, such as bores 619 formed in the cam base ring 602. The cam base ring 602 can further include inner and outer shoulders 620 and 621 respectively for, among other things, retaining the spring loaded ramps 606.

Preferably, when the CFG 600 is assembled, the springs 610 motivate the spring loaded ramps 606 to engage the load cam rollers 601 so that a cam roller 601 is positioned substantially at the flat surface 609 of a respective spring loaded ramp 606. The spring 610 is configured to actuate the spring loaded ramp 606 to cause the load cam roller 601 to roll up the spring loaded ramp 606 for some distance to produce a preload that ensures that a certain minimum level of clamping force will be available during operation of the CVT 50. During operation, input torque is delivered to the cam base ring 602. The torque transferring shoulders 608 deliver the input torque to the spring loaded ramps 606. Under load, the spring loaded ramp 606 tends to wedge between the torque transferring shoulder 608 and, the load cam roller 601. The spring 610 can facilitate, among other things, the wedging action of the spring loaded ramp 606. The load cam roller cage 622 that is coupled to the load cam roller 601 and the spring loaded ramp 606 can be configured to prevent the load cam roller 601 from decoupling from the spring loaded ramp 606 during a freewheeling or back-driving condition.

Figure 9C:
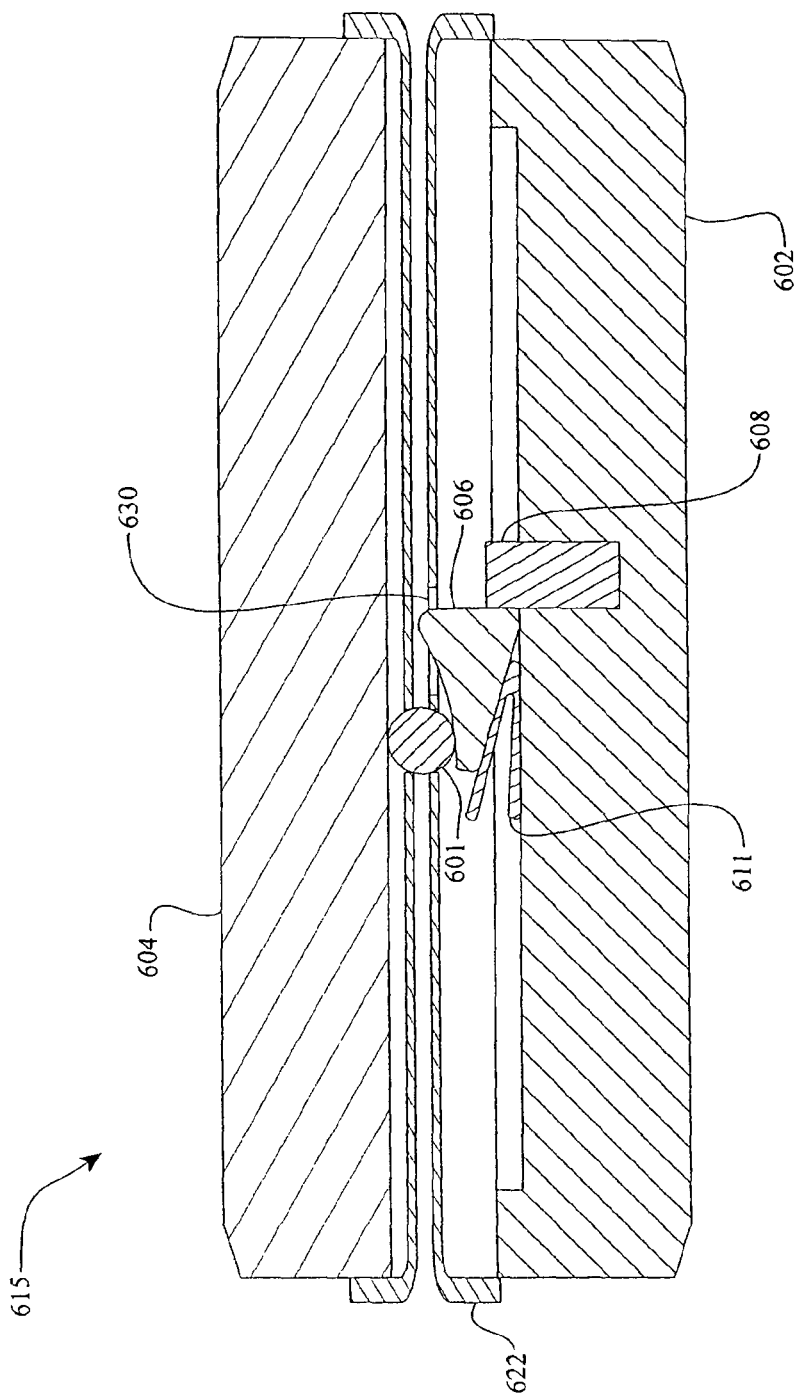
FIG. 9C is a cross-sectional view of another CFG having spring loaded ramps.

In some embodiments, such as the one shown in FIG. 9C, a CFG 615 includes springs 611 that can be used instead of springs 610. The springs 611 can be scissor springs of the compression type, for example, and can be attached to the cam base ring 602. In other embodiments, the springs 610 can be wave springs (not shown) of the compression type, for example, and can be retained in radial slots (not shown) instead of bores 619 formed into the cam base ring 602.

Figure 9D:
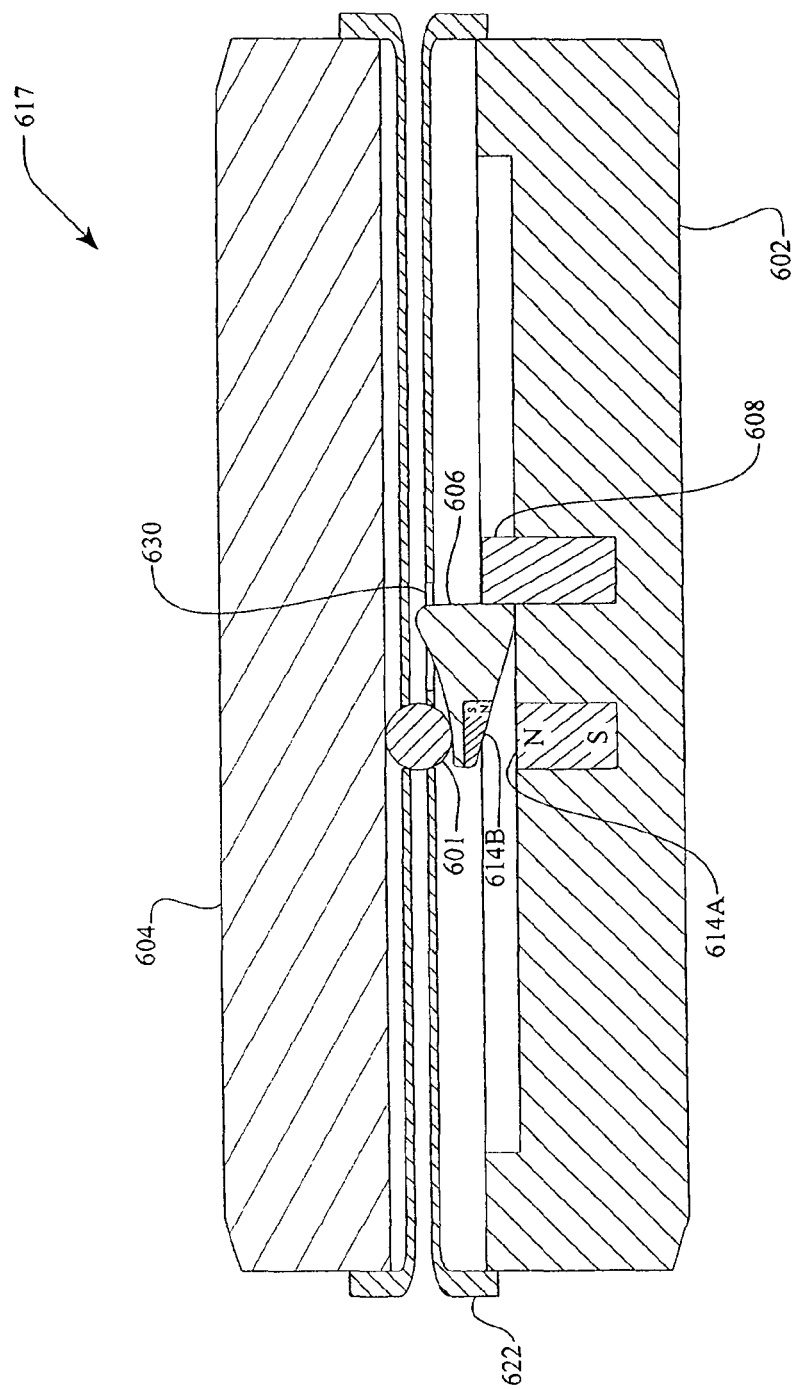
FIG. 9D is a cross-sectional view of still another CFG having spring loaded ramps.
Figure 10A:
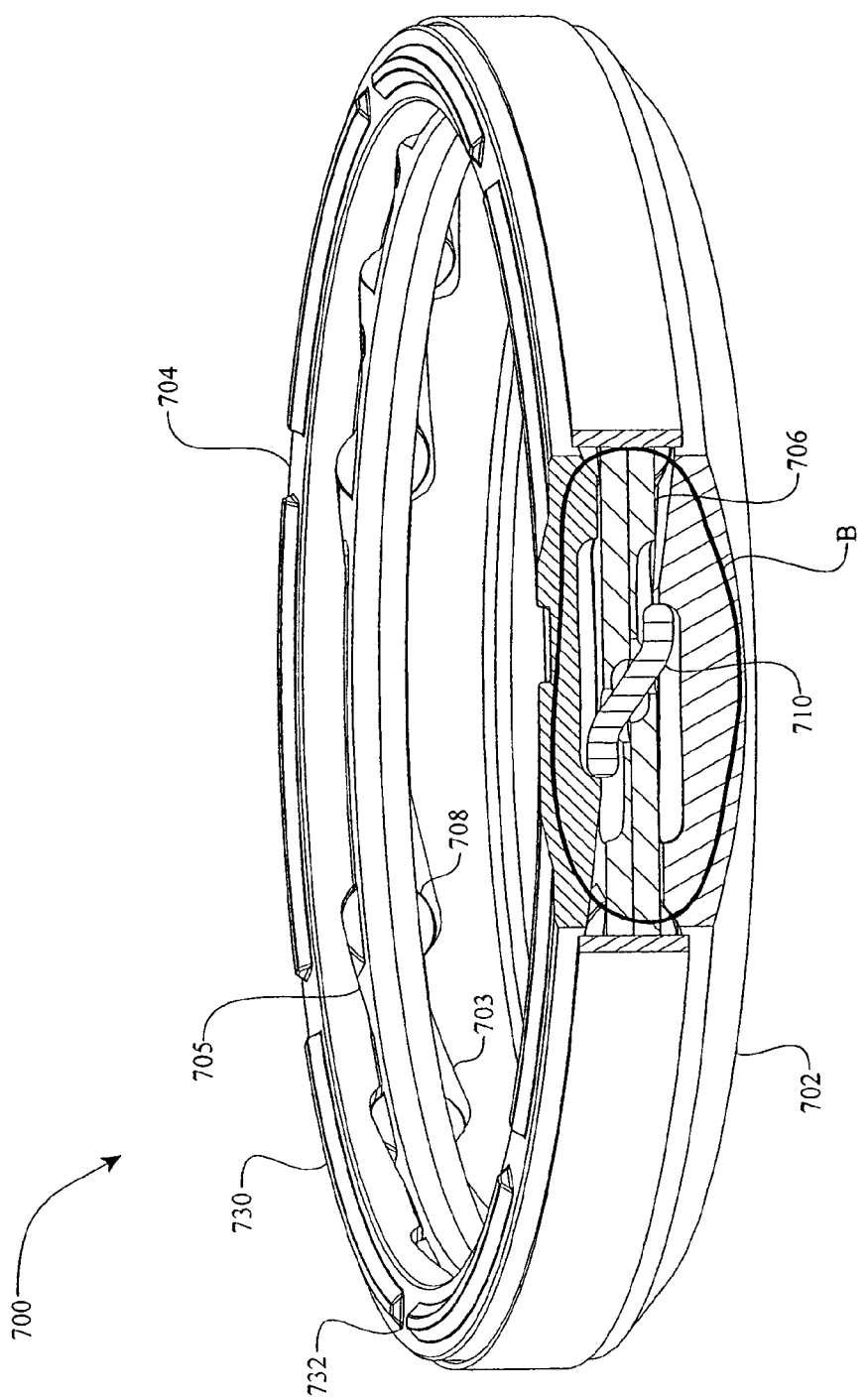
FIG. 10A is a partially sectioned, perspective view of yet a different CFG that can be used in a CVT.
Figure 10B:
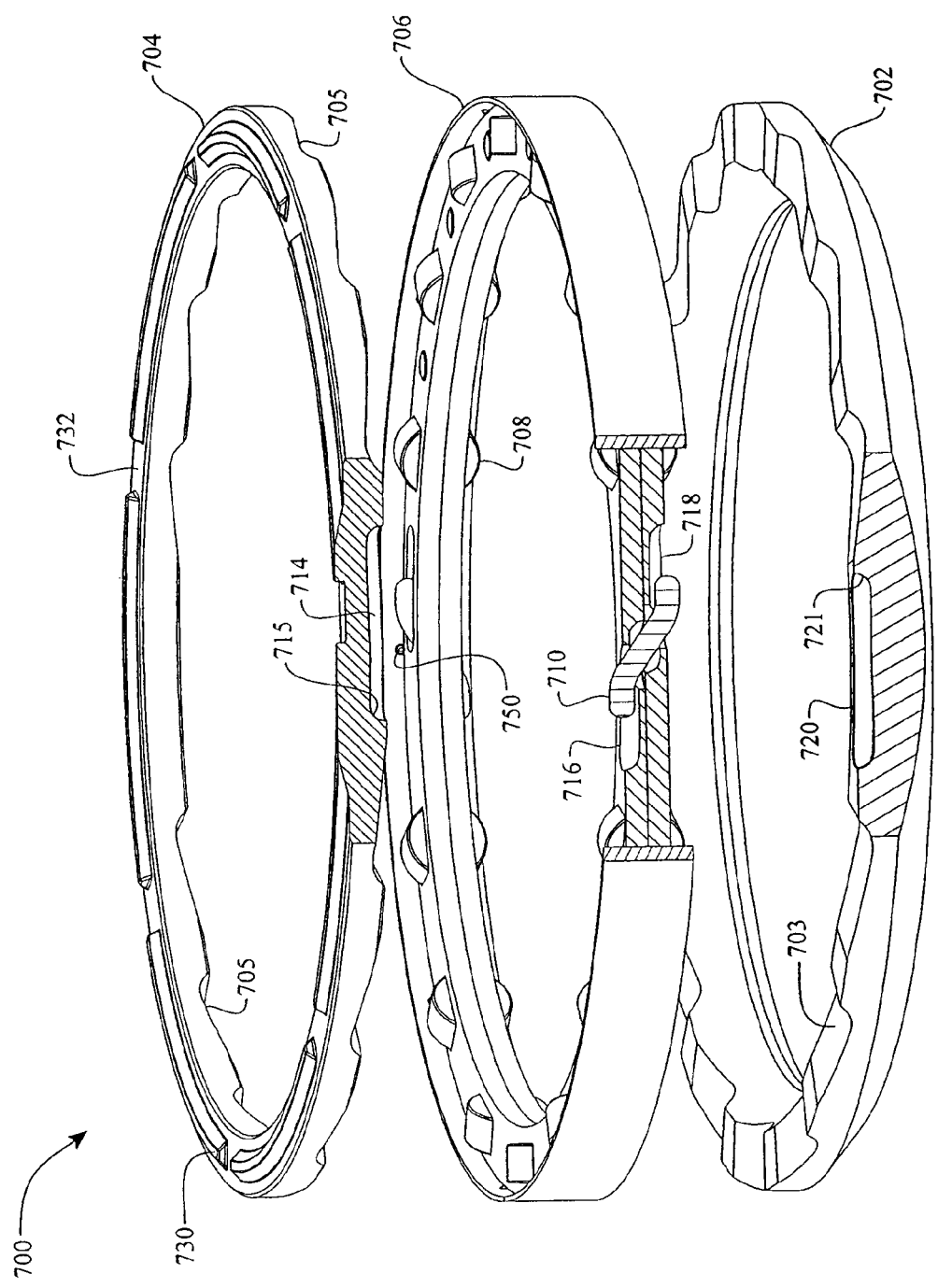
FIG. 10B is a partially sectioned, exploded assembly view of the CFG of FIG. 10A.
Figure 10C:
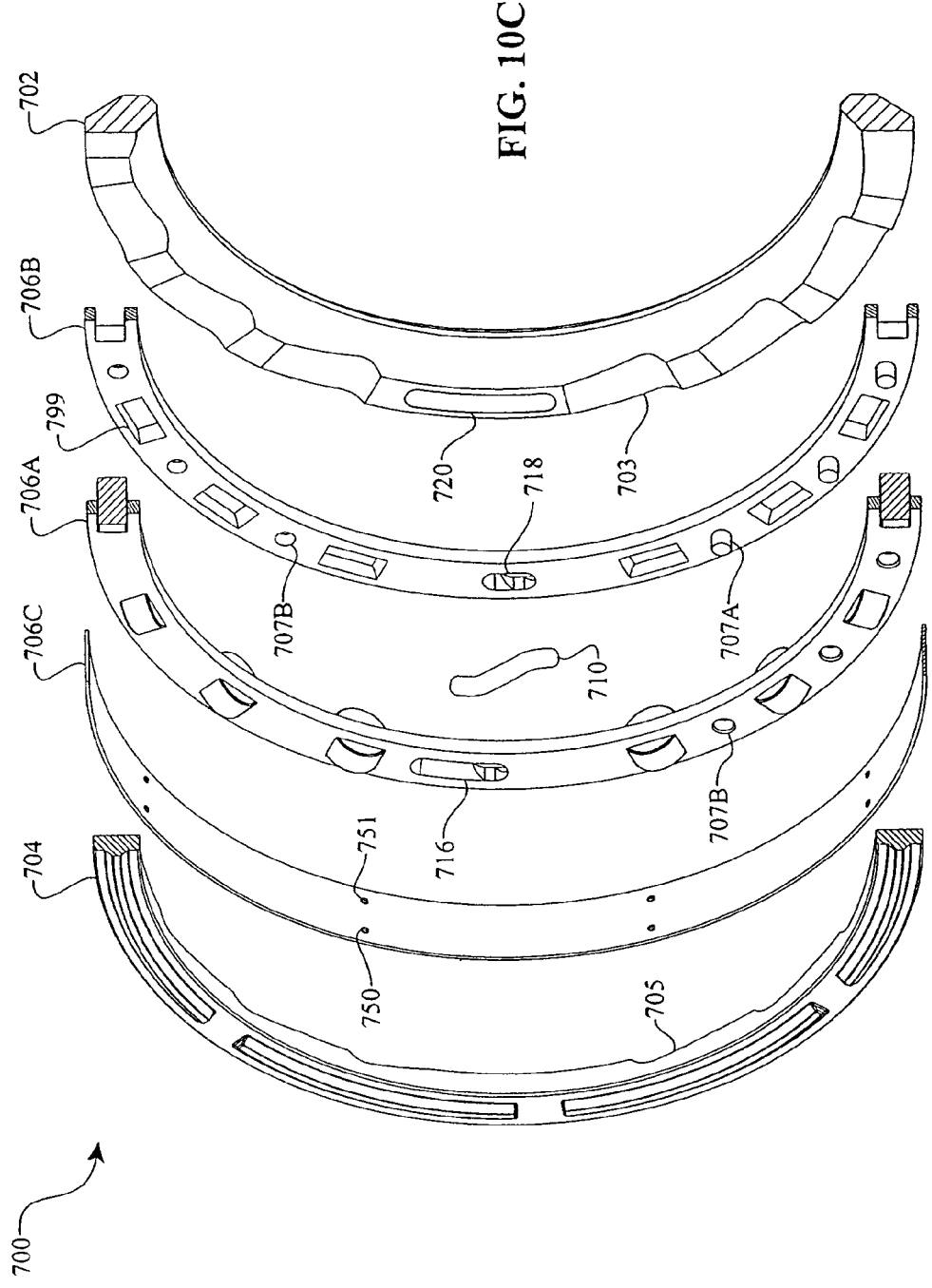
FIG. 10C is a partially cross-sectioned and exploded assembly view of the CFG of FIG. 10A.
Figure 10D:
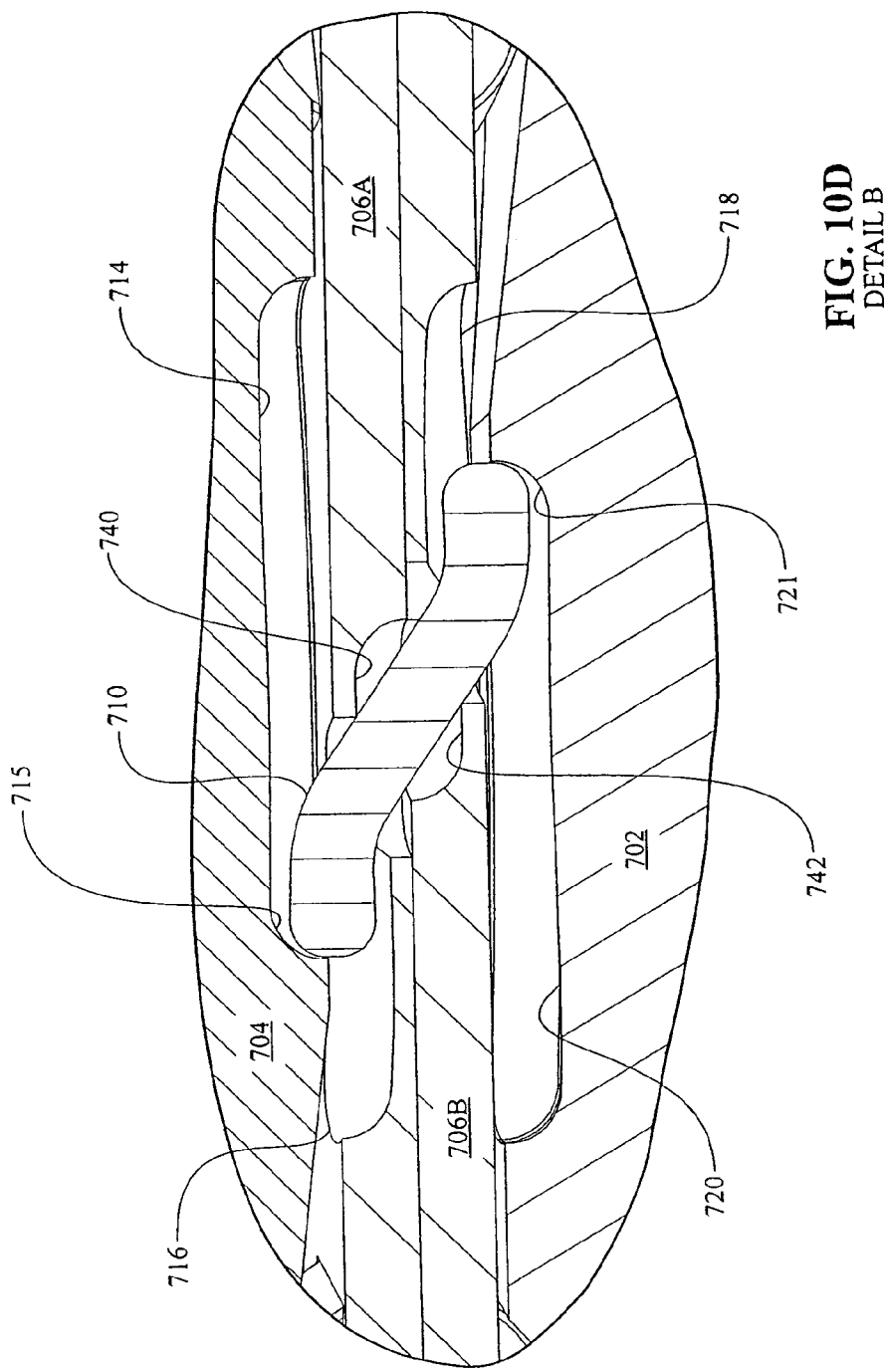
FIG. 10D is a detailed view B of the CFG of FIG. 10A.

In yet other embodiments, such as the one shown in FIG. 9D, a CFG 617 uses a set of magnetic elements 614A and 614B, wherein the magnetic element 614A can be arranged in a substantially similar manner as the springs 610 and the magnetic element 614B can be attached to one end of the spring loaded ramp 606 so that the resultant force generated between the magnetic elements 614A, 614B provides the desired preload force on the spring loaded ramp 606.

Turning now to FIGS. 10A-10D, in one embodiment a CFG 700 can include a traction ring 702, a cam driver 704, and a load cam roller cage 706 in cooperation with a plurality of load cam rollers 708. The traction ring 702 can be formed with a plurality of ramps 703. Similarly the cam driver 704 can be formed with a plurality of ramps 705. The ramps 703 and 705 are substantially similar to ramps 106 and are arranged to contact the load cam rollers 708. The load cam rollers 708 are retained in the load cam roller cage 706 that functions substantially similar to cage 76. A plurality of springs 710, for example two, can be retained in the load cam roller cage 706 and can be arranged to contact the cam driver 704 and the traction ring 702. In the embodiment illustrated in FIG. 10A, the cam driver 704 can be provided with radial splines 730 and slots 732. The splines 730 and slots 732 function to, among other things, mate with an input coupling provided on the CVT 50 that is generally of the kind disclosed previously.

In one embodiment, the load cam roller cage 706 includes a first slotted ring 706A coupled to a second slotted ring 706B. In some embodiments, the first and second slotted rings 706A, 706B are received in a band 706C. The first slotted ring 706A and the second slotted ring 706B can be provided with slots 799. The first slotted ring 706A and the second slotted ring 706B can be coupled together with, for example, a plurality of pegs 707A and bores 707B. In some embodiments, each of the slotted rings 706 has equally as many pegs 707A as bores 707B. The arrangement of the pegs 707A and the bores 707B around the face of the slotted rings 706 can be configured to accommodate various manufacturing methods, such as plastic injection molding. For example, the arrangement of the pegs 707A and the bores 707B can allow the slotted rings 706 to be substantially identical for manufacture while retaining features for alignment during assembly. In one embodiment, the pegs 707A are arranged around half the circumference of the slotted ring 706 while the bores 707B are arranged around the other half of the circumference so that once assembled the slotted rings 706A and 706B are aligned when joined. In some embodiments, the slotted rings 706A and 706B are further retained around their outer circumference or periphery with the band 706C. The band 706C can be a generally annular ring made from, for example, steel or aluminum. An outer circumference of the band 706C can have a number of protrusions 750 and 751. The protrusions 750 and 751 are generally aligned with the slotted rings 706A and 706B. The protrusions 750 and 751 are configured to, among other things, axially retain and align the slotted rings 706A and 706B. It will be readily apparent to a person of ordinary skill in the relevant technology that the load cam roller cage 706 can be used in various applications in the same manner as the cage 76, the cage 108, or the cage 622.

Still referring to FIGS. 10A-10D, a plurality of springs 710, for example two, are retained in load cam roller cage 706 and are arranged in such a way that one end of the spring 710 couples to the cam driver 704 and the other end of the spring 710 couples to the traction ring 702. The springs 710 can be generally arranged 180-degrees with respect to each other for configurations provided with two springs. In one embodiment, a middle portion of the spring 710 is retained in the load cam roller cage 706. Shoulders 740 and 742 formed on the slotted rings 706A and 706B, respectively, can be provided to capture the middle portion of the spring 710. In some embodiments, the spring 710 can be a coil spring of the compression type. In other embodiments, the spring 710 can be a wire spring. In yet other embodiments, the spring 710 can be a flat spring. It is preferable that the ends of spring 710 have rounded or curved surfaces that have generally the same shape as reaction surfaces 715 and 721.

A groove 714 can be formed onto the cam driver 704. Similarly, a groove 720 can be formed onto the traction ring 702. Once assembled, the grooves 714 and 720 aid to, among other things, retain the spring 710 and provide the reaction surfaces 715 and 721, respectively. Channels 716 and 718 can be formed into the slotted rings 706A and 706B to provide clearance for the spring 710.

Preferably, when the CFG 700 is assembled, the springs 710 are configured to apply a force on the cam driver 704 and the traction ring 702 that engages the load cam rollers 708 with the cam driver 704 and the traction ring 702. The load cam rollers 708 are positioned generally on the flat portion of the ramps 703 and 705. The interaction between the traction ring 702, the cam driver 704, and the springs 710 causes the cam rollers 708 to roll up the ramps 703 and 705 for some distance to produce a preload that ensures that a certain minimum level of clamping force will be available during operation of the CVT 50.

Figure 11A:
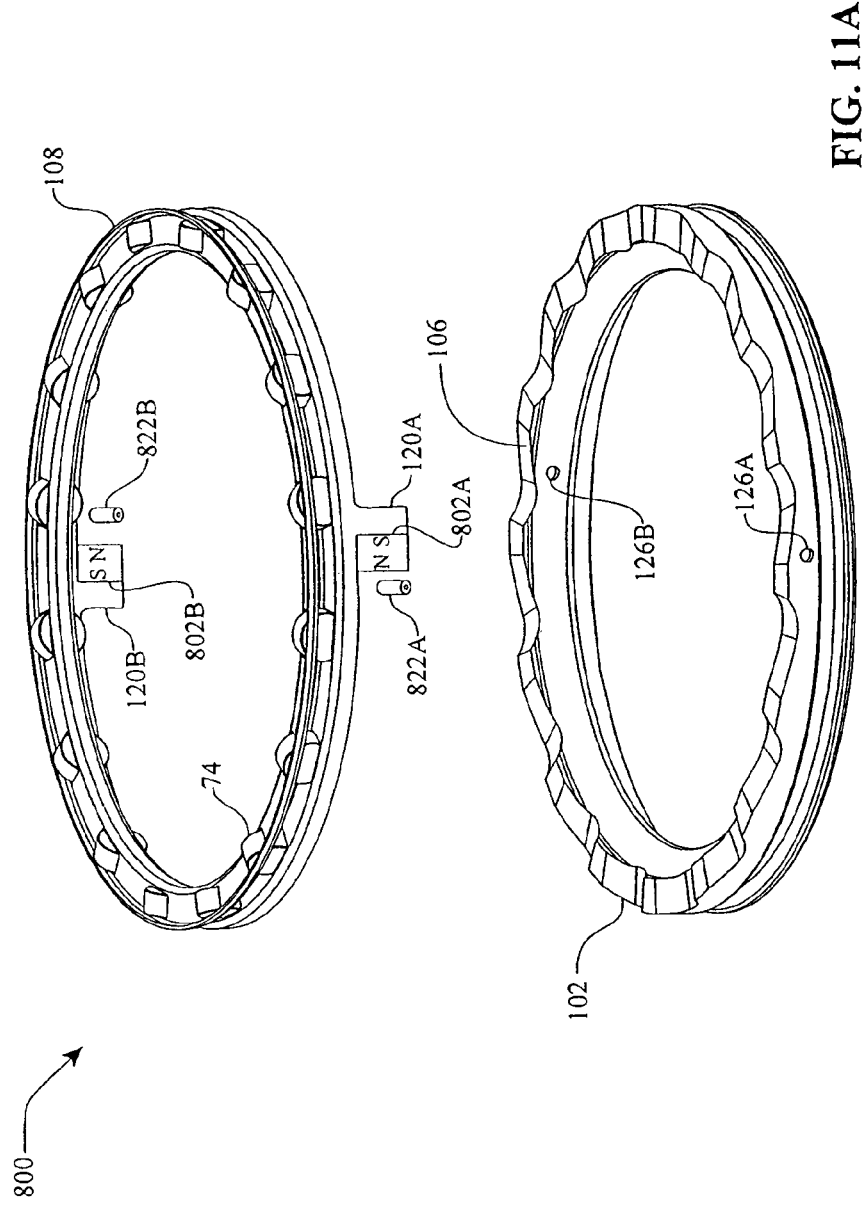
FIG. 11A is an exploded assembly view of yet one more CFG, which can be used in transmissions such as the CVT of FIG. 1.

Turning now to FIG. 11A, in one embodiment a CFG 800 can include the traction ring 102 and the load cam roller cage 108, as well as other components of the CFG 100. However, in this embodiment, the CFG 800 uses magnets 802 and 822 instead of the springs 112 and the wires 114. Magnet 802A can be attached to the tab 120A while the magnet 822A can be attached at the bore 126A so that the arrangement of the magnetic poles on the magnet 802A and the magnet 822A provides the desired resultant force between the traction ring 102 and the roller cage 108 in a substantially similar manner as the springs 112 and wire 114. The magnetic elements 802 and 822 can have different shapes and, consequently, the shapes shown are merely an example. Upon assembly of the CFG 800, the magnets 802 and 822 energize the roller cage 108 and consequently move the load cam rollers 74 up the ramps 106 to produce a preload that ensures a certain minimum level of clamping force during operation of the CVT 50.

Referring to FIG. 11B, in one embodiment a CFG 900 can include a traction ring 902, cam driver 904, and a number of load cam rollers 74. The cam driver 904 can be formed with a number of ramps 906 that are substantially similar to the ramps 106. A plurality of magnetic elements 910 can be arranged and mounted on the traction ring 902 and/or the cam driver 904. The magnetic force generated by an individual magnetic element 910 energizes the load cam roller 74 to tend to roll the cam roller 74 some distance up the ramp 906 to produce a minimum level of clamping force during operation of the CVT 50. In other embodiments such as the one illustrated in FIG. 11C, a CFG 901 can include load cam rollers 974 and certain components of the CFG 900. The load cam roller 974 can be a magnetic element so that the load cam roller 974 tends to attract and contact the traction ring 902 and the cam driver 904. The load cam rollers 974 can be cylindrical rollers, barrel-shaped rollers, or spherical rollers.

Figure 12:
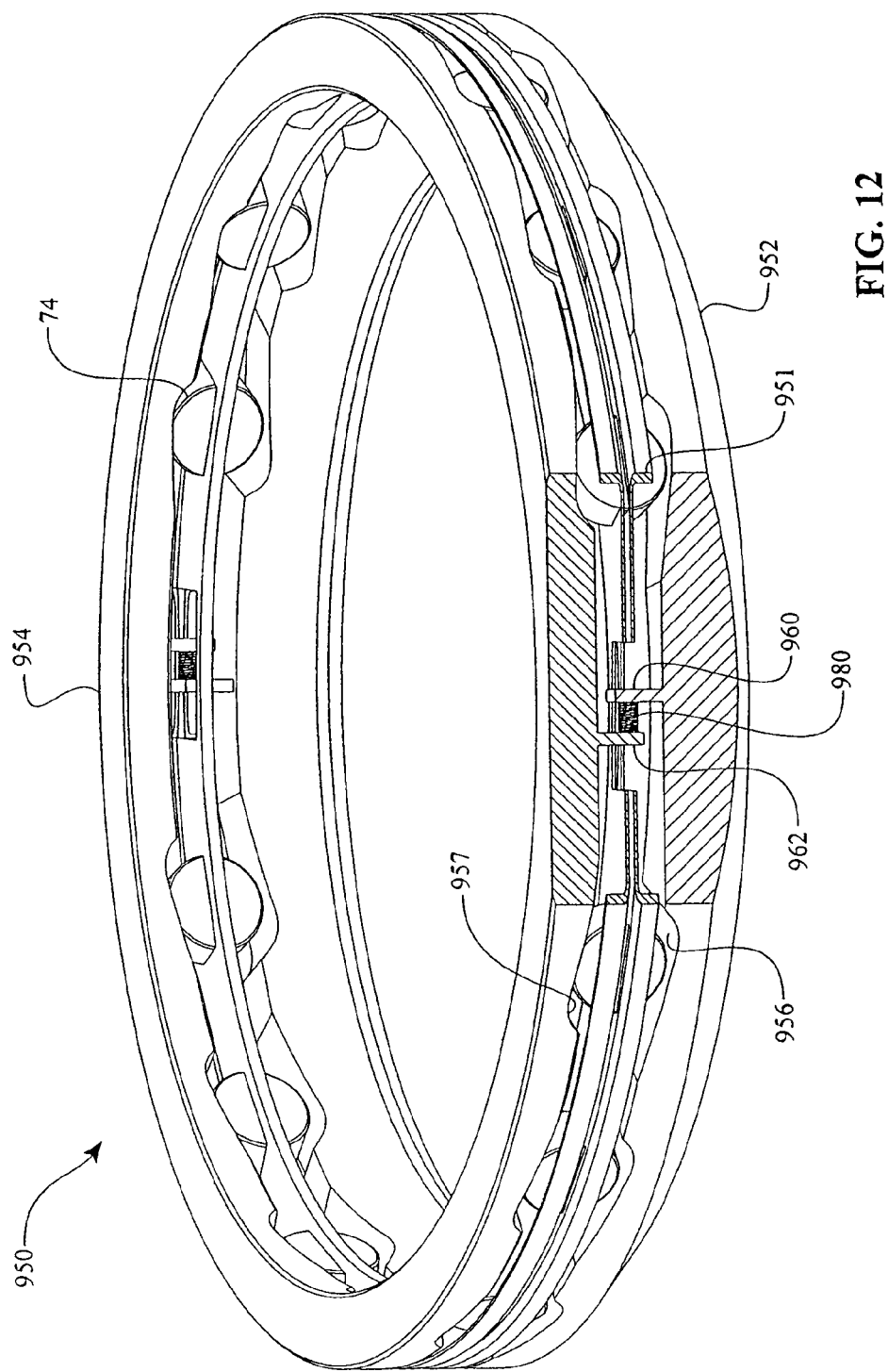
FIG. 12 is a partially sectioned, perspective view of another CFG, which can be used in transmissions such as the CVT of FIG. 1.

Referring to FIG. 12, in one embodiment a CFG 950 can include a traction ring 952, a cam driver 954, and a plurality of load cam rollers 74. A number of ramps 956 can be integral to the traction ring 952. A second plurality of ramps 957 can be integral to the cam driver 954. The ramps 956 and 957 are substantially similar to ramps 106 and cooperate with load cam rollers 74 to produce a clamping force during operation of the exemplary CVT 50. A load cam roller cage 951 can retain the load cam rollers 74. A group of tabs 960 can extend from the traction ring 952 at a substantially ninety degree angle from the side of the traction ring 952 having the ramps 956. A second group of tabs 962 can extend at a substantially ninety degree angle from the cam driver 954 having the ramps 957. The tabs 960 and 962 can be formed with flat or angled faces that are generally assembled to be in proximity to each other during operation. Typically, the tabs 960 and 962 are arranged to operate within slots of the load cam roller cage 951. In some embodiments, the tabs 960 and 962 are formed on the outer diameter of the traction ring 952 and the cam driver 954 and can operate generally outside of the load cam roller cage 951. In one embodiment, a spring element 980 can attach to the tabs 960 and 962, respectively. One end of spring element 980 can be attached to the tab 960 while the other end of the spring element 980 can be attached to tab 962. In some embodiments, magnetic elements can replace the spring element 980 and can be arranged to produce a resultant force that tends to direct the traction ring 952 away from the cam driver 954. The spring element 980 can be a coil spring of the compression type, a scissor spring such as spring 611, or wave spring, for example.

Referring now to FIGS. 13A-13F, in one embodiment, a CFG 1000 can include a traction ring 1002, a plurality of load cam rollers 74, and a cam driver 1004. A plurality of ramps 1006 with pockets 1006P can be integral to the traction ring 1002. In some embodiments, the ramps 1007 can be integral to the cam driver 1004 and have pockets 1007P. The load cam rollers 74 can be retained in a load cam roller cage 1008, which can be substantially similar to load cam roller cage 76, 108, or 622. In some embodiments, slots 1009 provided in the load cam roller cage 1008 can also be used to retain a number of spacer elements 1010. In one embodiment, the load cam roller cage 1008 is provided with sixteen slots 1009, eight of which retain load cam rollers 74 and eight of which retain spacer elements 1010. In other embodiments, the load cam roller cage 1008 can be provided with at least three slots 1009, at least one of which retains a load cam roller 74 and at least one of which retains a spacer element 1010.

Figure 13A:
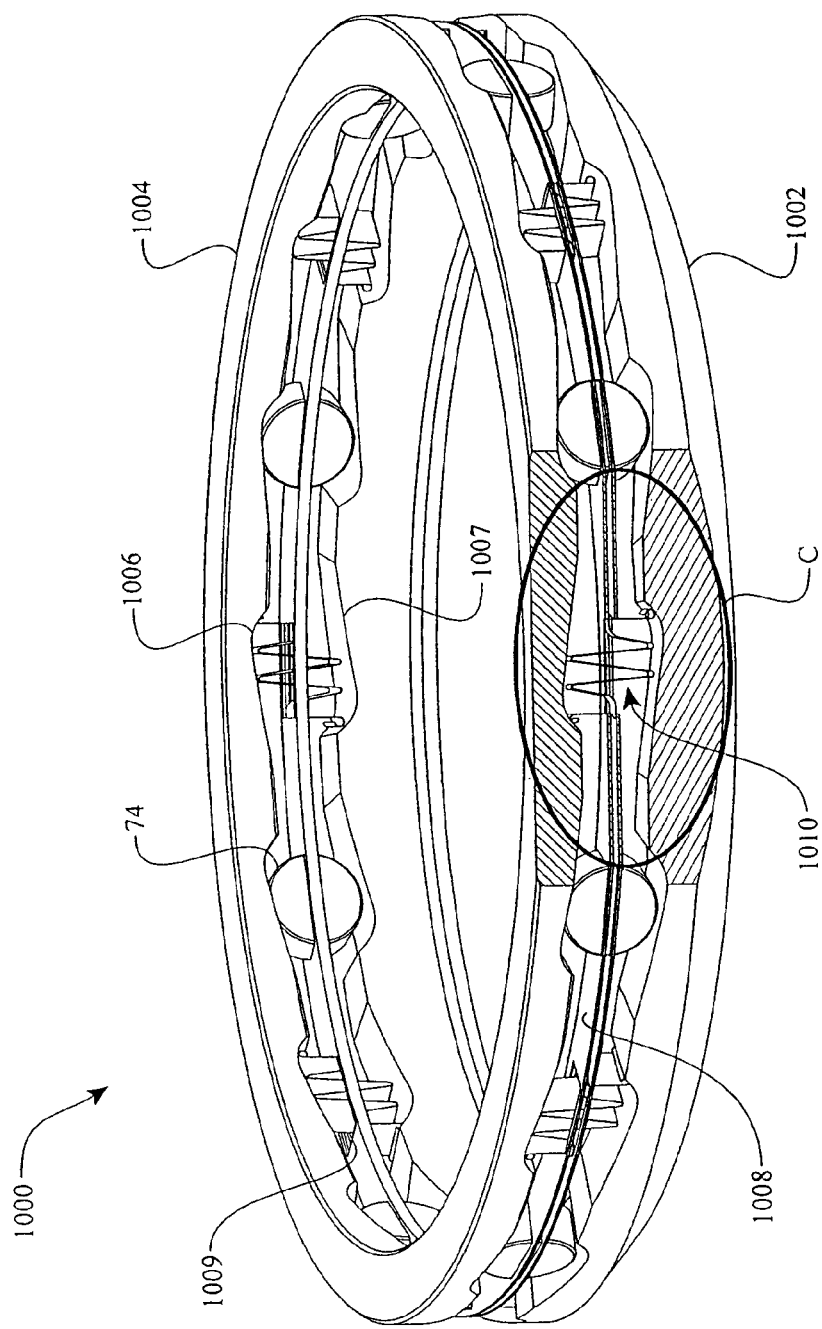
FIG. 13A is a perspective view of another CFG, which can be used in transmissions such as the CVT of FIG. 1.
Figure 13B:
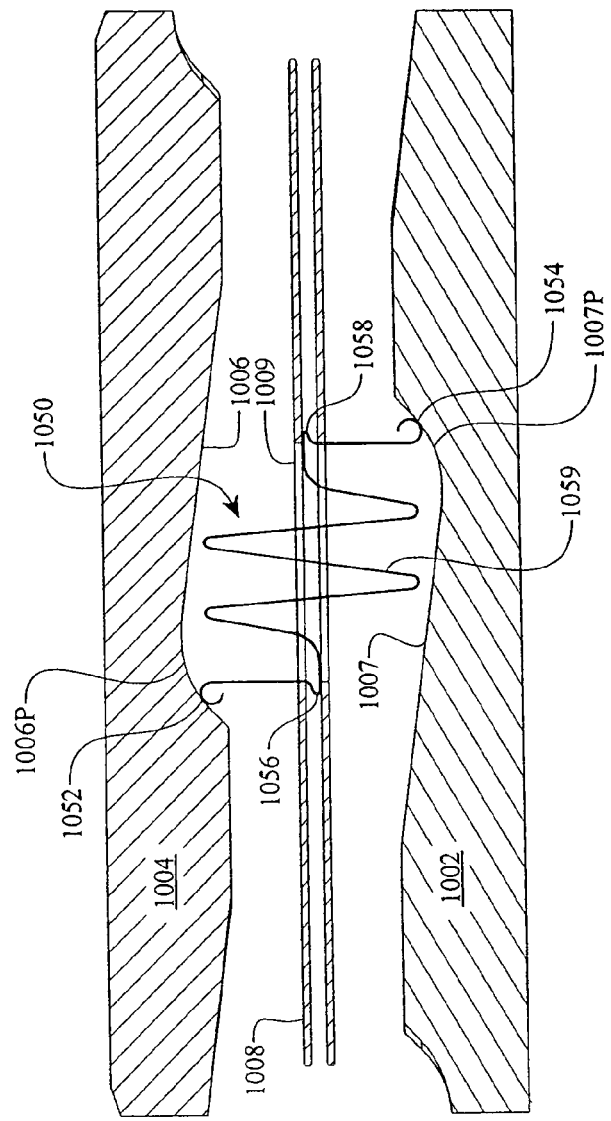
FIG. 13B is a detail view C1 of certain components of the CFG of FIG. 13A.

Referring now to FIG. 13B, in one embodiment the spacer element 1010 can be a spring 1050. The spring 1050 can be formed from flat spring steel that is known in the relevant technology. The width of the flat spring steel can be approximately equal to the width of the cam roller 74 and less than the width of the slot 1009. The spring 1050 can be provided with a number of bends. The wave spring 1050 can be provided on one end with a bend 1052 and on the opposite end with a bend 1054. The bends 1052 and 1054 are configured to contact, respectively, the pockets 1006P and 1007P. The spring 1050 can further be provided with retaining shoulders 1056 and 1058 that generally extend from the bends 1052 and 1054. The retaining shoulders 1056 and 1058 can be adapted to be retained in the roller cage 1008. A central portion of the wave spring 1050 can have a number of bends 1059 that give the wave spring 1050 elasticity. The elasticity of the spring 1050 allows, among other things, the spring 1050 to be compressed and inserted into the slots 1009 during assembly. In other embodiments, the spring 1050 can be provided with only the bend 1054, for instance in a configuration where the ramps 1006 are absent from the cam driver 1004. Turning now to FIG. 13C, in one embodiment a spacer element for a CFG 1005A can be a wire spring spacer 1030 arranged in the slot 1009 of load cam roller cage 1008. In this embodiment, the CFG 1005A includes a cam driver 1090. The wire spring spacer 1030 can be a curved wire 1032 retained on one end in a housing 1034. The housing 1034 can be made from plastic, for example, and be generally rectangular in shape with dimensions compatible With the dimensions of the slots 1009. The curved wire 1032 is configured to extend from the housing 1034 and to contact the pocket 1007P with a reaction surface 1036. For embodiments provided with integral ramps 1007 and 1006 on the traction ring 1002 and the cam driver, 1004, respectively, the wire spring spacer 1030 can be oriented so that at least one of the spacers 1030 is in contact with the ramps 1007 of the traction ring 1002 and at least one of the spacers 1030 is in contact with the ramps 1006 of the cam driver 1004.

Referring now to FIG. 13D, in one embodiment a spacer element for a CFG 1005B can be a wire spring spacer 1070 arranged in the slot 1009 of load cam roller cage 1008. The wire spring spacer 1070 can be a curved wire 1072 retained in bore 1075 of a housing 1074. The housing 1074 can be made from plastic, for example, and be generally rectangular in shape with dimensions compatible with the dimensions of the slots 1009. The curved wire 1072 is configured to extend from the housing 1074 and to contact the pockets 1007P and 1006P with reaction surfaces 1076 and 1077, respectively.

Figure 13E:
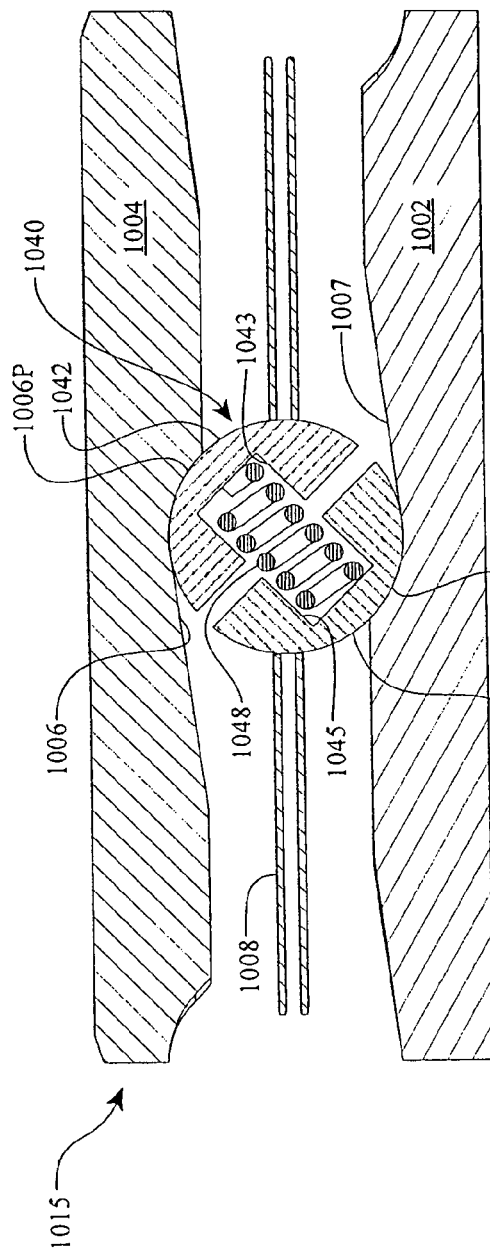
FIG. 13E is a cross-sectional view of certain components of yet another CFG.

Turning now to FIG. 13E, in a CFG 1015 the spacer element can be a spring loaded roller 1040. The spring loaded roller 1040 can include a first hemi-cylindrical body 1042 and a second hemi-cylindrical body 1044. The first hemi-cylindrical body 1042 can be provided with a pocket 1043, and likewise the second hemi-cylindrical body 1044 can be provided with a pocket 1045. The hemi-cylindrical bodies 1042 and 1044 can be coupled together by a spring 1048. One end of the spring 1048 can be attached in the pocket 1043 while the other end of the spring 1048 can be attached in the pocket 1045. Once assembled, the spring loaded roller 1040 can be arranged in slots 1009 formed in load cam roller cage 1008. The arrangement of the spring loaded rollers 1040 can be similar to the arrangement described previously for the wire spring spacers 1030; however, it is preferably to use the spring loaded roller 1040 in embodiments where both the traction ring 1002 and cam driver 1004 have, respectively, ramps 1007 and 1006. It will be readily apparent to a person having ordinary skill in the relevant technology that the spring load roller 1040 can be configured to accommodate cylindrical rollers, spherical rollers, or barrel-shaped rollers, for example.

Figure 13F:
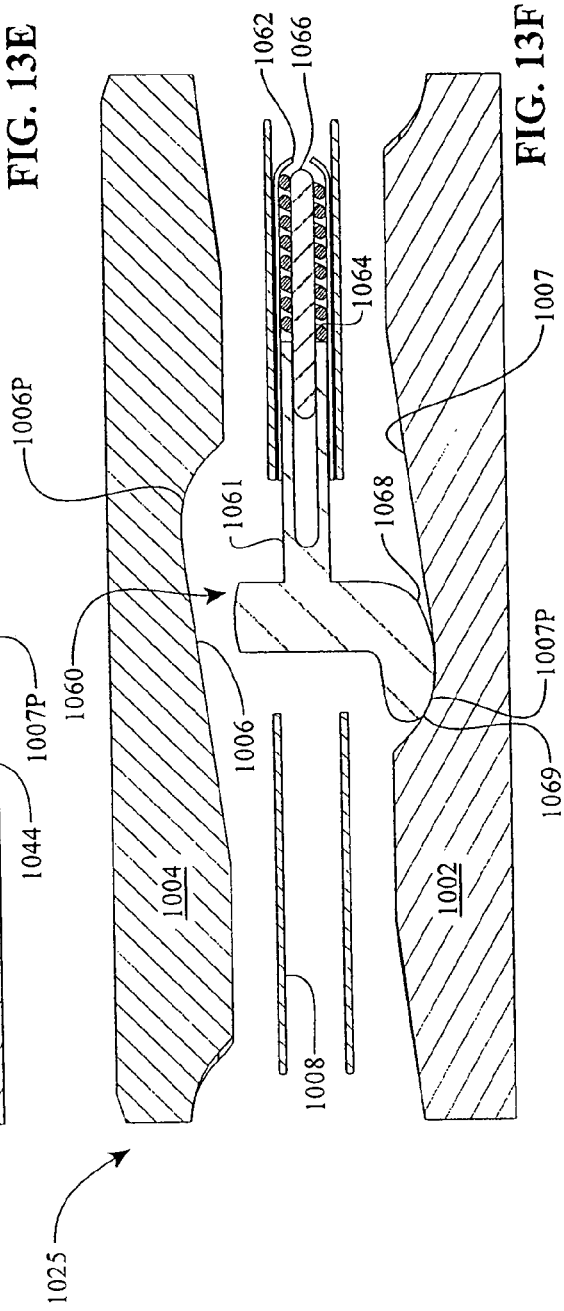
FIG. 13F is a cross-sectional view of certain components of a different CFG.

Passing now to FIG. 13F, in one embodiment a CFG 1025 includes a spacer element that is a spring loaded plunger 1060 retained in the road cam roller cage 1008. The spring loaded plunger 1060 can include a cylindrical sleeve 1062 adapted to enclose a spring 1064. The spring 1064 surrounds a guide 1066. A plunger 1061 can be coupled to one end of the spring 1064 and to the guide 1066. The sleeve 1062 can enclose a portion of the plunger 1061. The plunger 1061 can be provided with a foot 1068 that extends from the plunger 1061 to contact the pocket 1007P. The foot 1068 can be formed with a toe 1069 that is generally conformal to the pocket 1007P. In some embodiments, the spring loaded plungers 1060 can be arranged in the load cam roller cage 1008 so that a number of the spring loaded plungers 1060 are in contact with the pockets 1006P while a number of spring loaded plungers 1060 are in contact with the pockets 1007P.

Figures 14A, 14B:
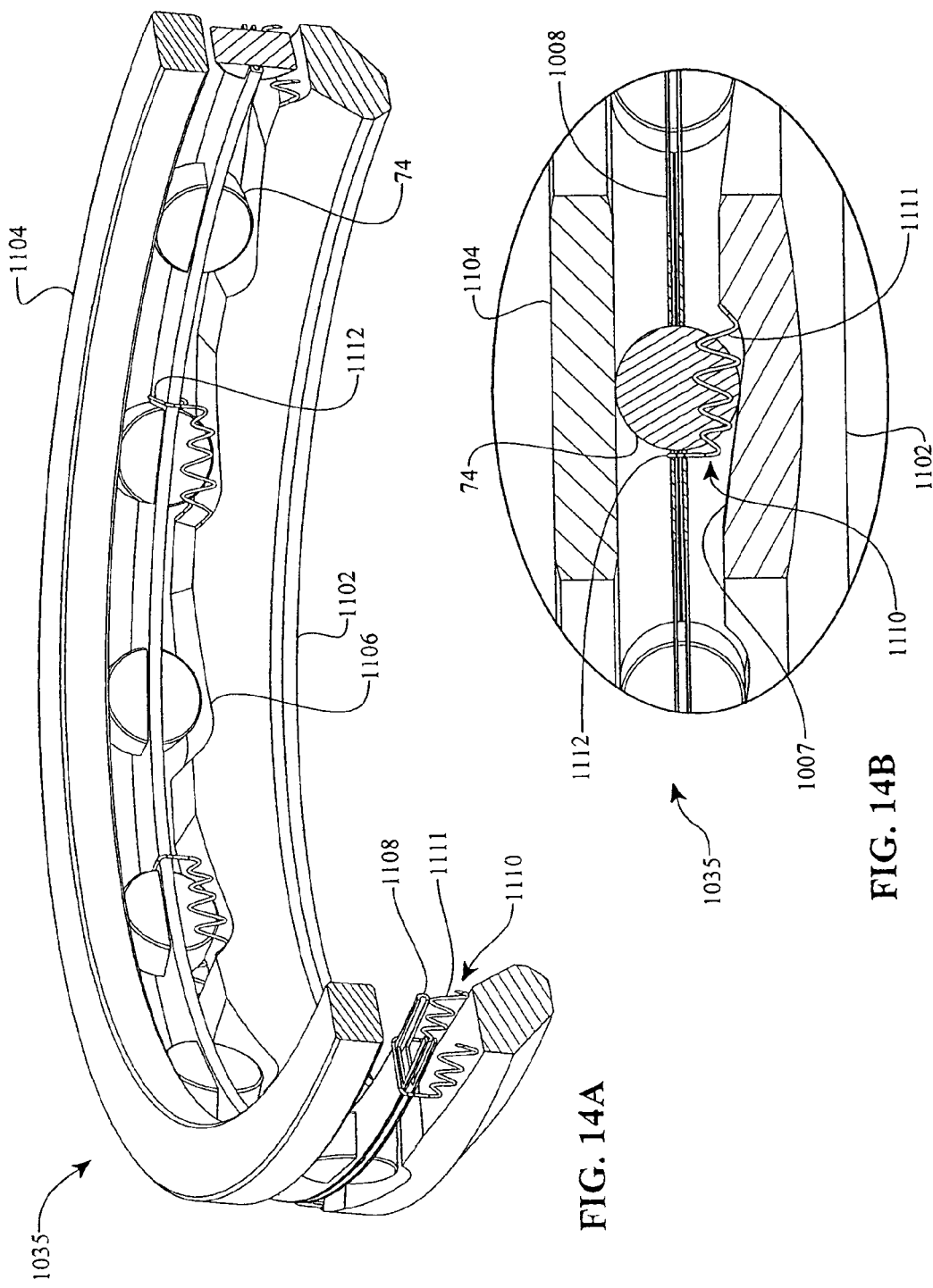
FIG. 14A is a partially sectioned, perspective view of yet another CFG which can be used in transmissions such as the CVT of FIG. 1.
FIG. 14B is a cross-sectional view of certain components of the CFG of FIG. 14A.

Referring now to FIGS. 14A-14B, in one embodiment a CFG 1035 can include a traction ring 1102 and a cam driver 1104 in contact with a plurality of load cam rollers 74. The load cam rollers 74 can be retained in load cam roller cage 1108. A number of wire springs 1110 can be attached to the load cam roller cage 1108. In some embodiments, the wire springs 1110 can be formed from metallic wire with a series of bends that form a generally U-shape structure having ends 1111 extending from a base 1112. The ends 1111 can contact the traction ring 1102. The base 1112 can clip to the load cam roller cage 1108 in such a way that the ends 1111 are positioned on each side of the load cam roller cage 1008. The ends 1111 can have a plurality of bends that give the wire spring 1110 elasticity. When the CFG 1035 is assembled, wire springs 1110 tend to position the load cam roller cage 1108 with respect to the traction ring 1102. The load cam roller cage 1108 engages the load cam rollers 74 so that they are positioned generally on the flat portion of the ramps 1106. The cam rollers 74 can roll up the ramps 1007 for some distance to produce a preload to ensure that a certain minimum level of clamping force will be available during operation of the exemplary CVT 50.

Turning now to FIGS. 15A-15B, in one embodiment a CFG 1500 included the traction ring 1002 and the cam driver 1004 in contact with a number of load cam rollers 601. The load cam rollers 601 couples to the load cam roller cage 1008. A number of wire clips 1550 couple to the load cam roller cage 1008. In some embodiments, a wire clip 1550 includes a series of bends that form an enclosing structure having a clip end 1506, clip end 1505, clip side 1508A, and clip side 1508B. More particularly, in some embodiments, the clip end 1506 is positioned perpendicular to the clip sides 1508, and similarly the clip end 1505 is positioned perpendicular to the clip sides 1508. The clip ends 1505, 1506 can be positioned substantially parallel to one another and at distal ends of the clip sides 1508. The clip sides 1508 are positioned parallel to each other, with the clip ends 1505, 1506 positioned between the clip sides 1508. Of course, in some embodiments, the clip ends 1505, 1506 and the clip sides 1508 are provided as a single, integral wire having the described clip ends 1505, 1506 and the clip sides 1508. In some embodiments, the clip sides 1508 have at least one bend (for example, forming a generally "S" shape) that enhances the elasticity of the wire spring 1550. The clip end 1506 is adapted to couple to the pocket 1007P. The clip end 1505 is adapted to couple to the pocket 1006P. When the CFG 1500 is assembled, the wire clips 1550 act to position the cam driver 1004 with respect to the traction ring 1002. The load cam roller cage 1108 engages the load cam rollers 601 in such a manner that the load cam rollers 601 are positioned generally on the flat portion of the ramps 1006 and 1007. Under the actuation of the wire clips 1550 on the cam driver 1004 and the traction ring 1002, the cam rollers 601 roll up the ramps 1006 and 1007 for some distance to produce a preload that ensures that a certain level of clamping force is during operation of the exemplary CVT 50.

Figures 16A, 16B:
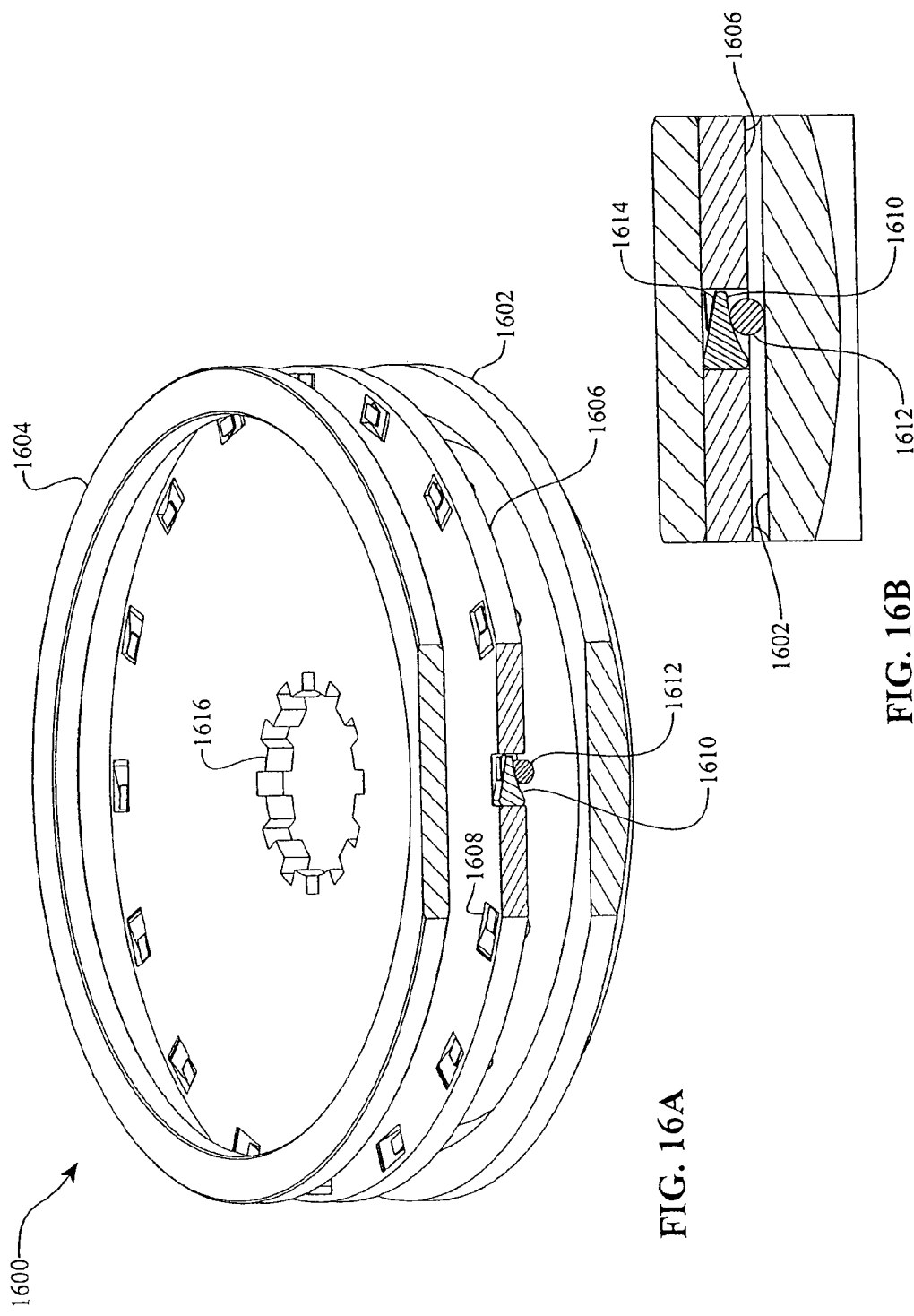
FIG. 16A is an exploded and partially sectioned view of a CFG that can be used with the CVT of FIG. 1.
FIG. 16B is a detail view of the CFG of FIG. 16A.

Passing to FIGS. 16A and 16B, a CFG 1600 includes a traction ring 1602, a cam driver 1604, and a load cam roller cage 1606 interposed between the traction ring 1602 and the cam driver 1604. In one embodiment, the load cam roller cage 1606 is adapted with a number of slots 1608, each slot 1608 configured to receive a spring loaded ramp 1610, a load cam roller 1612, and a spring 1614. The load cam roller cage 1606 additionally includes a central bore having a number of splines 1616. In some embodiments, the splines 1616 are preferably configured to engage mating splines (not shown) of a housing member of the CVT 100.

Figures 17A, 17B:
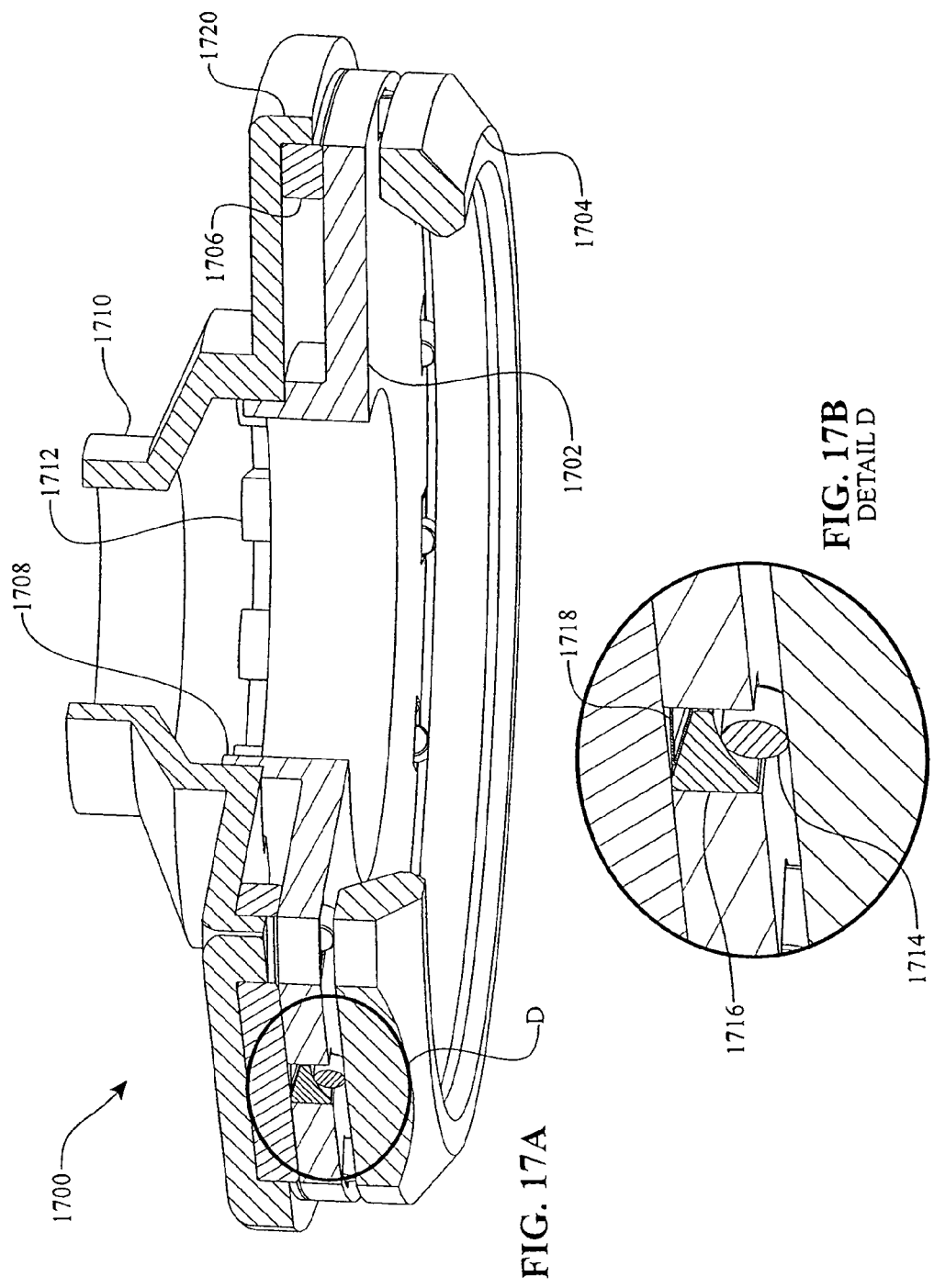
FIG. 17A is an assembly and partially sectioned view of yet another CFG that can be used with a CVT.
FIG. 17B is a Detail D view of the CFG of FIG. 17A.

Referencing FIGS. 17A and 17B now, a CFG 1700 includes a load cam roller cage 1702 positioned between a traction ring 1704 and a load reaction ring 1706. The load cam roller cage 1702 includes a flange having a number of cage splines 1708. An input torque driver 1710 includes a number of driver splines 1712 configured to mate with the cage splines 1708. In other embodiments, the input torque driver 1710 can be coupled to the load cam roller cage 1702 by any other suitable ways. The load reaction ring 1706 is adapted to react loads transmitted between the traction ring 1704 and the input torque driver 1710 via a load cam roller 1714, a spring loaded ramp 1716, and a spring 1718. Preferably, the load reaction ring 1706 is rotationally fixed to the input torque driver 1710, which can be accomplished with suitable coupling dowels, for example, between the input torque driver 1710 and the load reaction ring 1706. In one embodiment, the input torque driver 1710 includes a flange 1720 adapted to provide a guiding or receiving surface for the load reaction ring 1706. It should be noted that the CFG 1700 configuration provides for a decoupling of the axial load reaction and the torque transfer.

It should be noted that the description above has provided dimensions for certain components or subassemblies. The mentioned dimensions, or ranges of dimensions, are provided in order to comply as best as possible with certain legal requirements, such as best mode. However, the scope of the inventions described herein are to be determined solely by the language of the claims, and consequently, none of the mentioned dimensions is to be considered limiting on the inventive embodiments, except in so far as anyone claim makes a specified dimension, or range of thereof, a feature of the claim.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed:

1. A clamping force generation mechanism for a transmission, the mechanism comprising:
    a hub shell cover having a first reaction surface, the hub shell cover adapted to couple to a hub shell;
    a traction ring having a second reaction surface, wherein the traction ring comprises an annular groove, the second reaction surface comprising a set of ramps and a plurality of flat surfaces, the traction ring further comprising a traction surface;
    a plurality of load cam rollers interposed between the first and second reaction surfaces;
    a load cam roller retainer adapted to retain the plurality of load cam rollers, wherein the load cam roller retainer comprises a retainer tab extension; and
    a spring, adapted to be at least partially housed in the annular groove, the retainer tab extension configured to engage a first end of the spring, the traction ring adapted to engage a second end of the spring, wherein the plurality of load cam rollers are configured to roll up the set of ramps and come to rest on the plurality of flat surfaces of the traction ring.

2. The mechanism of claim 1, wherein the hub shell cover comprises a central bore adapted to receive a bearing.

3. The mechanism of claim 1, wherein the first reaction surface comprises a set of ramps.

4. The mechanism of claim 1, further comprising a cam driver having a set of ramps.

5. The mechanism of claim 1, wherein each of the plurality of load cam rollers is configured to roll along a path including at least one of the set of ramps and at least one of the plurality of flat surfaces.

6. A clamping force generator (CFG) for a transmission, the CFG comprising:
    a traction ring having a first side, a middle portion, and a second side, wherein the first side comprises a set of ramps and a plurality of flat portions and wherein the second side comprises a traction surface, wherein each of a plurality of load cam rollers is configured to roll along a path including at least one of the set of ramps and at least one of the plurality of flat portions;
    a spring having a first end and a second end;

wherein the traction ring is adapted to couple to one end of the spring; and a load cam roller retainer for retaining the plurality of load cam rollers, the load cam roller retainer having at least one tab adapted to engage the second end of the spring.

7. The CFG of claim 6, wherein the spring is a torsion spring, and wherein the traction ring comprises a hole for receiving the first end of the torsion spring.

8. The CFG of claim 6, wherein the set of ramps comprises spring-loaded ramps.

9. The CFG of claim 8, further comprising a set of torque transferring shoulders coupled to the spring-loaded ramps.

10. The CFG of claim 9, wherein a coupling between load cam rollers retained in the load cam roller retainer and the set of spring-loaded ramps is configured to prevent the load cam rollers from decoupling from the set of spring-loaded ramps during a free-wheeling or back-driving condition.

11. The CFG of claim 6, wherein when the torsion spring expands to a diameter that is substantially equal to an inner diameter of the retainer extension the load cam rollers are positioned substantially at or near the flat portions of the ramps.

12. The CFG of claim 6, wherein the spring is a torsion spring, and wherein when the torsion spring expands to its full diameter in a free, unwound state, the diameter of the torsion spring is larger than an inner diameter of the retainer extension.

13. The CFG of claim 6, wherein the CFG is an input-side clamping force generator.

14. A clamping force generation mechanism for a transmission, the mechanism comprising:

an annular ring having a first reaction surface having a first set of ramps;

a traction ring having a second reaction surface, wherein the traction ring comprises an annular groove, the second reaction surface comprising a second set of ramps and a plurality of flat surfaces;

a plurality of load cam rollers interposed between the first and second reaction surfaces, wherein each of the plurality of load cam rollers is configured to roll up the second set of ramps and come to rest on the plurality of flat surfaces of the traction ring;

a load cam roller retainer adapted to retain the load cam rollers, wherein the load cam roller retainer comprises a retainer tab extension;

and a spring, adapted to be at least partially housed in the annular groove, the retainer tab extension configured to engage a first end of the spring, the traction ring adapted to engage a second end of the spring.

15. The mechanism of claim 14, wherein the annular ring further comprises a central bore having a reinforcing rib.

16. The mechanism of claim 15, wherein the central bore further comprises a set of splines.

17. The mechanism of claim 15, wherein the annular ring further comprises a shoulder adapted to receive a thrust bearing.

18. The mechanism of claim 14, wherein the first reaction surface comprises a plurality of flat surfaces.

19. The mechanism of claim 14, wherein the traction ring further comprises a traction surface.

20. The mechanism of claim 14, wherein each of the plurality of load cam rollers is configured to roll along a path including at least one of the second set of ramps and at least one of the plurality of flat surfaces.

* * * * *